United States Patent
Akiyama et al.

(10) Patent No.: US 7,622,411 B2
(45) Date of Patent: Nov. 24, 2009

(54) THERMAL BARRIER COATING MATERIAL

(75) Inventors: Katsunori Akiyama, Yokohama (JP); Ichiro Nagano, Yokohama (JP); Masato Shida, Yokohama (JP); Satoshi Ota, Yokohama (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 179 days.

(21) Appl. No.: 10/550,097

(22) PCT Filed: Mar. 24, 2004

(86) PCT No.: PCT/JP2004/004010
§ 371 (c)(1),
(2), (4) Date: Jan. 18, 2007

(87) PCT Pub. No.: WO2004/085338
PCT Pub. Date: Oct. 7, 2004

(65) Prior Publication Data
US 2007/0151481 A1    Jul. 5, 2007

(30) Foreign Application Priority Data
Mar. 26, 2003   (JP) ............................. 2003-085609
Nov. 6, 2003    (JP) ............................. 2003-377119
Mar. 4, 2004    (JP) ............................. 2004-061427

(51) Int. Cl.
*C04B 35/101* (2006.01)
*C23C 4/10* (2006.01)

(52) U.S. Cl. ................ 501/135; 501/103; 501/104; 501/136; 252/62; 106/286.2; 106/286.6; 106/286.4; 423/598; 423/594.12; 423/594.8; 423/594.16

(58) Field of Classification Search .......... 501/152, 501/154, 134, 135, 136, 126, 103, 104; 423/263, 423/331, 326, 593.1, 594.3, 594.4, 598, 594.8; 106/286.2, 286.6, 287.1; 252/62
See application file for complete search history.

(56) References Cited

U.S. PATENT DOCUMENTS
3,856,545 A * 12/1974 Ferrigno .................. 106/462
(Continued)

FOREIGN PATENT DOCUMENTS
EP    0 848 077 B1    6/1998
(Continued)

OTHER PUBLICATIONS

Chemical Abstract citation 1984:602152: Tolochko et al, "Preparation and electrical properties of lanthanum barium nickel oxide (La2-xBaxNiO4) and lanthanum calcium nickel oxide (La2-xCaxNiO4)", Vesti Akademii Navuk BSSR, Seryya Khimichnykh Navuk (4), 1984, pp. 67-70.*

(Continued)

*Primary Examiner*—C. Melissa Koslow
(74) *Attorney, Agent, or Firm*—Birch, Stewart, Kolasch & Birch, LLP

(57) ABSTRACT

There is provided a novel thermal barrier coating material which does not have a problem of phase transition, whose melting point is higher than its working temperature range, whose thermal conductivity is smaller than that of zirconia, and whose thermal expansion coefficient is greater than that of zirconia. The thermal barrier coating material comprises as a main component, a composition having an orthorhombic or monoclinic structure derived from perovskite (for example, a tabular perovskite structure expressed by the composition formula $A_2B_2O_7$), or a tetragonal layer structure having a c axis/a axis ratio equal to or greater than 3 (for example, a $K_2NiF_4$ structure, a $Sr_3Ti_2O_7$ structure, or a $Sr_4Ti_3O_{10}$ structure), a composition expressed by the composition formula $LaTaO_4$, or a composition having an olivine type structure expressed by the composition formula $M_2SiO_4$ or $(MM')_2SiO_4$ (where M, M' are divalent metal elements).

4 Claims, 10 Drawing Sheets

U.S. PATENT DOCUMENTS

| | | | | |
|---|---|---|---|---|
| 3,953,173 | A * | 4/1976 | Obayashi et al. | 436/151 |
| 4,030,937 | A * | 6/1977 | Nakai et al. | 501/136 |
| 4,173,518 | A * | 11/1979 | Yamada et al. | 205/384 |
| 4,511,636 | A * | 4/1985 | Vogel et al. | 429/41 |
| 4,986,933 | A * | 1/1991 | Asada et al. | 252/520.1 |
| 5,008,221 | A * | 4/1991 | Ketcham | 501/103 |
| 5,013,360 | A * | 5/1991 | Finkelstein et al. | 106/1.23 |
| 5,114,742 | A * | 5/1992 | Branovich et al. | 427/77 |
| 5,629,251 | A | 5/1997 | Miyata | |
| 6,093,338 | A * | 7/2000 | Tani et al. | 252/62.9 R |
| 6,117,560 | A | 9/2000 | Maloney | |
| 6,190,579 | B1 * | 2/2001 | Billings | 252/515 |
| 6,194,083 | B1 | 2/2001 | Yasuda et al. | |
| 6,258,467 | B1 | 7/2001 | Subramanian | |

FOREIGN PATENT DOCUMENTS

| | | | |
|---|---|---|---|
| EP | 1331208 | * | 7/2003 |
| JP | 57-144546 | * | 9/1982 |
| JP | 4-231451 A | | 8/1992 |
| JP | 7-316831 A | | 12/1995 |
| JP | 10-212108 A | | 8/1998 |
| JP | 10-330157 | * | 12/1998 |
| JP | 11-264083 A | | 9/1999 |

OTHER PUBLICATIONS

Science & Technology Trends, Dec. 2001, "http://www.nistep.go.jp/achiev/ftx/jpn/sftc/stt009j/feature3.html#4-0", Ministry Of Education, Culture, Sports, Science and Technology Japan, National Institute of Science and Technology Policy, Science and Technology Foresight Center.

* cited by examiner

FIG. 10   MgO-MnO-SiO$_2$

THERMAL BARRIER COATING MATERIAL

TECHNICAL FIELD

The present invention relates to a thermal barrier coating material applicable to equipment parts used in a high temperature environment such as of a rotor blade of a gas turbine for power generation, a stator blade, a combustor, and a jet engine.

BACKGROUND ART

In order to increase the efficiency of gas turbines, jet engines, and the like, the temperature of the combustion gas continues to be increased. As a result, in order to protect metal parts from the high temperature (for example, blade surface temperature of a 1500° C. class gas turbine reaches approximately 1400° C.), a thermal barrier coating (TBC) is coated on the surface of the parts. As a material for this thermal barrier coating, ceramic having a low thermal conductivity such as rare earth stabilized zirconia is used (for example, refer to Japanese Unexamined Patent Applications, First Publications No. Hei 08-074505, and No. Hei 10-183013). The above thermal barrier coating is applied by means of atmospheric pressure plasma spraying over a metallic adhering layer applied to a substrate, which is the metal part, by means of low pressure plasma spraying or the like.

The thermal barrier coating applied on the metal part by means of atmospheric pressure plasma spraying is not of a dense constitution, and internally has a large number of pores. FIG. 1 shows a schematic diagram of the constitution of the thermal barrier coating. As shown in FIG. 1, the structure of the thermal barrier coating is such that a zirconia substrate 1 has various kinds of pores such as large pores 2 with diameters of several tens of microns, small pores 3 with diameters of several microns, and narrow, line-shaped pores 4 and 5. The zirconia substrate 1 itself is a ceramic having a low thermal conductivity, and at the same time, a large number of such pores 2 to 5 inside maintain the thermal insulation property of the material. As a result, the substrate, which is the metal part, can be used in a high temperature environment.

Zirconia, which is used as a material for high temperature structures including thermal barrier coatings, is not a single composition ($ZrO_2$), but is used in a state in which several mol % of rare earth oxide are added as a stabilizing agent (partially stabilized zirconia). The reason for this is that pure Zirconia ($ZrO_2$), to which no stabilizer has been added, has the following two phase transitions:

Monoclinic←up to 1000° C.→tetragonal←2370° C.→cubic and the volume of pure zirconia itself changes acutely as its temperature rises or drops, with the result that it is destroyed in the phase transition between monoclinic and tetragonal phases, so that pure zirconia cannot be used as a material for high temperature structure. Consequently, it is necessary to add several mol % of rare earth oxide and to stabilize the tetragonal phase, which is the phase in the working temperature range, even at low temperature, so as not to generate a monoclinic phase. It has been reported that even for partially stabilized zirconia, for which the amount of stabilizing agent is controlled in order to stabilize the tetragonal phase, a monoclinic phase progressively precipitates when used for a long period of time at a high temperature and in a heat cycle where the temperature is repeatedly increased and decreased, and this has been an important problem in using zirconia as a thermal barrier coating.

There has also been a report of applying material of a cubic pyrochlore type structure such as $La_2Zr_2O_7$ as a thermal barrier coating material instead of zirconia (refer to Japanese Unexamined Patent Application, First Publication No. Hei 10-212108, European Patent No. 0848077, and U.S. Pat. No. 6,117,560). In these patent documents, $La_2Zr_2O_7$ is a suitable material for a thermal barrier coating because its thermal conductivity and oxygen permeability are smaller than that of zirconia. However, there is a problem of an actual remaining tensile stress between the coating and the substrate metal part, since the thermal expansion coefficient of $La_2Zr_2O_7$ is smaller than that of zirconia.

DISCLOSURE OF INVENTION

Accordingly, for a zirconia thermal barrier coating material, phase stability must be secured. Moreover, for a material used for the thermal barrier coating, the melting point needs to be high and the thermal conductivity needs to be as small as possible, and the thermal expansion coefficient is required to be as close as possible to that of the metal part in order not to let tensile stress occur between the coating and the substrate metal part.

The present invention has been achieved in order to solve the above problems, and its object is to provide a novel thermal barrier coating material which does not have a problem of phase transition, whose melting point is higher than its working temperature range, whose thermal conductivity is smaller than that of zirconia, and whose thermal expansion coefficient is greater than that of zirconia.

As described above, in order to provide a novel thermal barrier coating material as a substitute for zirconia, having a higher melting point than its working temperature range, a small thermal conductivity, and a large thermal expansion coefficient, the present inventors searched for a material using the first principle calculation. The "first principle calculation" is a method of obtaining various physical property values on a nanometer scale by changing the conditions for solving a primitive equation of quantum mechanics.

The present inventors performed the calculation under the conditions of having a melting point higher than the temperature of its working temperature range, 1400° C., a smallest possible thermal conductivity, and a largest possible thermal expansion coefficient. As a result, it was discovered that compositions having an orthorhombic or monoclinic structure derived from perovskite (for example, a tabular perovskite structure expressed by the composition formula $A_2B_2O_7$), or a tetragonal layer structure having a c axis/a axis ratio equal to or greater than 3 (for example, a $K_2NiF_4$ structure, a $Sr_3Ti_2O_7$ structure or a $Sr_4Ti_3O_{10}$ structure), or a composition expressed by the composition formula $LaTaO_4$, satisfy the above requirements. Since the crystal structures of these materials are more complex than that of zirconia material, which has a fluorite type structure, or that of cubic pyrochlore material, they can be expected to display low thermal conductivity, and since they are long in one axial direction, they can be expected to display a high thermal expansivity, and they are considered to be suitable materials for a thermal barrier coating.

In the material of the present invention that is expressed by the above composition formula $A_2B_2O_7$ and has a structure derived from perovskite, preferably, the above component element A is selected from the group consisting of La, Nd and Sr, and the above component element B is selected from the group consisting of Ti, Si, Nb and Ta. It has been confirmed by the present inventors that by using these elements, a suitable material for forming a thermal barrier coating film with a thermal expansion coefficient greater than that of zirconia, and a thermal conductivity smaller than that of zirconia can be obtained.

Moreover, in the thermal barrier coating material of the present invention that has the above $K_2NiF_4$ structure and is expressed by the composition formula $X_2YO_4$, the above component element X is preferably La or Sr, and the component element Y is preferably Ni or Ti. It has been confirmed by the present inventors that by using these elements, a suitable material for forming a thermal barrier coating film with a thermal expansion coefficient greater than that of zirconia, and a thermal conductivity smaller than that of zirconia can be obtained.

The above thermal barrier coating materials have sufficiently high thermal expansivities and low thermal conductivities as they are. However, when combining two or more kinds of compositions selected from these compositions, it can be easily presumed that their high thermal expansivities and low thermal conductivities would not be derogated. As a result, they are considered to be sufficiently suitable materials for a thermal barrier coating. Alternatively, even when another element is added to the above thermal barrier materials or to a material that is a combination thereof, it can be easily presumed that their high thermal expansivities and low thermal conductivities would not be derogated as long as their crystal structures are not derogated.

Furthermore, as a result of carrying out a separate investigation and study, the present inventors discovered that a material having an olivine type structure expressed by the composition formula $M_2SiO_4$ or $(MM')_2SiO_4$ (where M and M' are divalent metal elements) conforms to the conditions of having a higher melting point than the temperature of its working temperature, a low thermal conductivity, and a large thermal expansivity. Specifically, the above component element M is preferably Mg or Ni, and the above component element M' is preferably a metal element selected from the group consisting of Ca, Co, Ni, Fe, and Mn. The majority of these metal elements are olivine group mineral substances that naturally stably exist. Furthermore, in particular Mg and Ca among the above metal elements are inexpensive compared to rare earths.

Furthermore, since the density of $M_2SiO_4$ is approximately ½ to ⅚ of zirconia, a reduction in total weight can be achieved when applying it as a thermal barrier coating, and $M_2SiO_4$ is also suitable for practical use as it can be expected to produce a good effect on the efficiency of a gas turbine and the like.

Furthermore these materials derived in the calculations, and in the investigation and research of the present invention have sufficiently high thermal expansivities and low thermal conductivities as they are. However, even when used in combination with the currently used zirconia material, it can be easily presumed that their high thermal expansivities and low thermal conductivities would not be derogated as long as the combination conforms to the combination expression described in examples described later. As a result, these materials are considered to be sufficiently suitable for a thermal barrier coating material even when combined with zirconia material.

Moreover, as a result of carrying out further searching for a composition that satisfies the conditions of a suitable thermal barrier coating material described above, the present inventors have discovered that the above requirements can be satisfied by: a material that comprises as a main component an oxide containing Nb and either an alkaline earth metal or a rare earth element; a material that comprises as a main component a composition having a metal element selected from the group consisting of Al, V, Cr, Fe, Ga, Y, Rh, In, Ce, Nd, Sm, Eu, Gd, Dy, Ho, Er, Tm, Yb, and Lu replacing La in the composition expressed by the composition formula $LaTaO_4$; or by a material that comprises as a main component an alkaline earth metal and an oxide containing Ta.

An embodiment of the present invention is a thermal baffler coating material applicable to a thermal barrier coating for coating the surface of a base metal, comprising as a main component an oxide expressed by the composition formula $La_{(1-x)}M''_xTaO_4$ (where $0<x\leq1$, and M'' is a metal element selected from the group consisting of Al, V, Cr, Fe, Ga, Y, Rh, In, Ce, Nd, Sm, Eu, Gd, Dy, Ho, Er, Tm, Yb, and Lu).

An oxide selected from the group consisting of $Sr_4Nb_2O_9$, $Sr_5Nb_4O_{15}$, $Ca_2Nb_2O_7$, $YNbO_4$ and $LaNbO_4$ has been confirmed to be preferable as an oxide containing Nb and the above alkaline earth metal or rare earth element. Moreover, $Ca_4Ta_2O_9$ or $BaTa_2O_6$ have been confirmed to be preferable as an oxide containing the above alkaline earth metal and Ta.

Furthermore, the present inventors have confirmed that in a thermal barrier coating material containing the composition expressed by the composition formula $X_2YO_4$ described above, the component element X is preferably any one of Pr, Nd and Eu, and the above component element Y is preferably Ni.

The above compositions that can constitute a thermal barrier coating material relating to the present invention can be mutually combined or can be combined with zirconia material to be used. Specifically, it is possible to mutually combine and use: an oxide containing Nb and alkaline earth metal or rare earth element; a composition having another metal element replacing La in the composition formula $LaTaO_4$; or an oxide containing alkaline earth metal and Ta, such as $Ca_4Ta_2O_9$ and $BaTa_2O_6$; and they can also be combined with commonly known zirconia material to be used. Moreover, these ceramic compositions can be suitably used for a thermal barrier coating material even when combined with: a composition expressed by the composition formula $A_2B_2O_7$ (where the component element A is an element selected from the group consisting of La, Nd and Sr, and the component element B is an element selected from the group consisting of Ti, Si, Nb and Ta); a composition that has a $K_2NiF_4$ structure and is expressed by the composition formula $X_2YO_4$, where the component element X is La or Sr, and the component element Y is Ni or Ti; a composition expressed by the composition formula $Sr_3Ti_2O_7$ or $Sr_4Ti_3O_{10}$; or a composition expressed by the composition formula $LaTaO_4$.

Meanwhile, for the Sr—Nb combined oxide $Sr_2Nb_2O_7$ and $Sr_4Nb_2O_9$ described above, still lower thermal conductivity can be achieved by replacing the Nb site with Ti or Zr to bring to a solid solution. Specifically, the above oxide may be an oxide expressed by $Sr_2Nb_{2-x}Ti_xO_7$ ($0<x\leq2$), or by $Sr_2Nb_{2-x}Zr_xO_7$ ($0<x\leq2$), or by $Sr_4Nb_{2-x}Ti_xO_9$ ($0<x\leq2$), or by $Sr_4Nb_{2-x}Zr_xO_9$ ($0<x\leq2$).

This is because phonon scattering is further suppressed and thermal conductivity is obstructed, since pentavalent Nb, which is in the most stable electronic state, is partially replaced with a tetravalent element, and oxygen defects are generated, and the crystal structure becomes more complex. A large number of other elements having a quadrivalent electronic state exist. However, since the ion radius of other elements in the quadrivalent electronic state is not appropriate, structures of $Sr_2Nb_2O_7$ and $Sr_4Nb_2O_9$ cannot be maintained. Therefore, Ti or Zr is selected as an element with which the Nb site is replaced to bring to a solid solution.

Furthermore, $SrYb_2O_4$ and $Sr_4Yb_2O_9$ as well as $Ca_{11}Nb_4O_{21}$, $La_3NbO_7$ and $DyNbO_4$ come to have low thermal conductivities as they maintain a structure similar to the crystal structure described so far. As a result, they can be suitably used for a thermal barrier coating material.

Moreover, as is the case with Sr—Nb combined oxides, further lower thermal conductivity of $BaTa_2O_6$ can be achieved by replacing the Ta site with Ti or Zr to bring to solid solution. Specifically, oxides expressed by $BaTa_{2-x}Ti_xO_6$, or $BaTa_{2-x}Zr_xO_6$ ($0<x\leqq2$) can be provided.

In this case, phonon scattering is further suppressed and thermal conductivity is obstructed, since pentavalent Ta, which is in the most stable electronic state, is partially replaced with a tetravalent element, and oxygen defects are generated, and the crystal structure becomes more complex. A large number of other elements having a quadrivalent electronic state exist. However, since the ion radius of other elements in the quadrivalent electronic state is not appropriate, a structure of $BaTa_2O_6$ cannot be maintained. Therefore, Ti or Zr is selected as an element with which the Ta site is replaced to bring to a solid solution.

Moreover, as with the above Ba—Ta combined oxide, further lower thermal conductivity of $LaNiO_4$ can be achieved by replacing the La site with Ca to bring to a solid solution. Specifically, an oxide expressed by $La_{2-x}Ca_xNiO_4$ ($0<x\leqq2$) can be provided.

In this case, phonon scattering is further suppressed and thermal conductivity is obstructed, since trivalent La, which is in the most stable electronic state, is partially replaced with a bivalent element, and oxygen defects are generated, and the crystal structure becomes more complex. A large number of other elements having a bivalent electronic state exist. However, since the ion radius of other elements in the bivalent electronic state is not appropriate, a structure of $LaNiO_4$ cannot be maintained. Therefore, Ca is selected as an element with which the La site is replaced to bring to a solid solution.

Furthermore, the thermal barrier coating material of the present invention may comprise as a main component a combined oxide containing tungsten oxide. Specifically, it may comprise as a main component a composition expressed by the composition formulas $J_6WO_{12}$ and $J_2WO_6$ (where the component element J is an element selected from rare earth elements).

The above compositions that can constitute a thermal barrier coating material relating to the present invention can be mutually combined or can be combined with zirconia material to be used. Specifically, a combined material can be suitably used for a thermal barrier coating material even when the combination is made between: a Sr—Nb combined oxide $Sr_2Nb_2O_7$ or $Sr_4Nb_2O_9$ and a solid solution in which the Nb site in the Sr—Nb combined oxide is replaced with Ti or Zr; $SrYb_2O_4$ and $Sr_4Yb_2O_9$ or $Ca_{11}Nb_4O_{21}$, $La_3NbO_7$, and $DyNbO_4$; $BaTa_2O_6$ and a solid solution in which the Ta site in $BaTa_2O_6$ is replaced with Ti or Zr to bring to a solid solution; and between $LaNiO_4$ and a solid solution in which the La site in $LaNiO_4$ is replaced with Ca.

Next, a heat resistant member of the present invention is characterized in that the thermal barrier coating film, which uses the thermal barrier coating material of the present invention described above, is formed on a substrate. According to this constitution, by having a film formed from the thermal barrier coating material of the present invention, which has a higher thermal expansion coefficient and lower thermal conductivity compared to currently used zirconia, an excellent heat resistance is achieved, and an excellent peeling resistance of the coating in a heat cycle can be achieved. As a result, a heat resistant member which can be used for a long period of time can be provided.

According to the present invention, a material that has a higher thermal expansion coefficient and lower thermal conductivity compared to currently used zirconia, and that can be more suitably used for the thermal barrier coating film can be provided by having the material comprise as a main component: a composition expressed by the composition formula $A_2B_2O_7$ (in particular a composition where the component element A=La, Nd or Sr, and the component element B=Ti, Si, Nb or Ta); a composition expressed by the composition formula $X_2YO_4$ and having a $K_2NiF_4$ structure (in particular a composition where the component element X=La or Sr, and the component element Y=Ni or Ti); a composition expressed by $Sr_3Ti_2O_7$, $Sr_4Ti_3O_{10}$ or $LaTaO_4$; or a composition in which two or more of these compositions are combined.

In addition, according to the present invention, inexpensive thermal barrier coating material that has a higher thermal expansion coefficient and lower thermal conductivity, and is lighter compared to currently used zirconia, can be provided, by having the material comprise as a main component a composition expressed by the composition formula $M_2SiO_4$ or $(MM')_2SiO_4$ and having an olivine structure (in particular composition where the component element M=Mg or Ni, and the component element M'=Ca, Co, Ni, Fe or Mn).

Moreover, according to the present invention, a thermal barrier coating material that has a higher thermal expansion coefficient and lower thermal conductivity than that of currently used zirconia can be provided by having the material contain: an alkaline earth metal or rare earth element and an oxide containing Nb; a composition in which La in the composition expressed by the composition formula $LaTaO_4$ is replaced with a metal element selected from the group consisting of Al, V, Cr, Fe, Ga, Y, Rh, In, Ce, Nd, Sm, Eu, Gd, Dy, Ho, Er, Tm, Yb, and Lu; or an oxide containing alkaline earth metal and Ta.

Furthermore, according to the present invention, a thermal barrier coating material for which the thermal expansion coefficient and thermal conductivity are controlled within a more appropriate range can be provided, by having the material contain the above ceramic compositions combined either mutually or with a commonly known zirconia material.

BEST MODE FOR CARRYING OUT THE INVENTION

Figure 1:
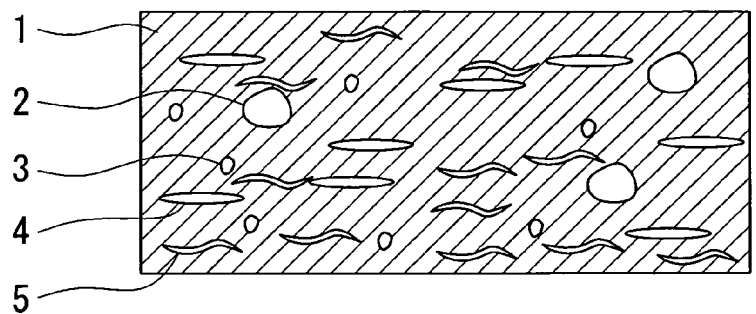
FIG. 1 is a schematic diagram showing the structure of a thermal barrier coating.

Hereinafter, examples of the present invention are described, with reference to the drawings.

EXAMPLE 1

It is known that various kinds of physical property values at a nanometer scale can be obtained by changing conditions for solving a primitive equation in quantum mechanics. This method is a research method that performs an ab initio calculation, which does not use experimental results as a parameter, to obtain the information sought, and it is known as a "first principle calculation". In the present invention, this first principle calculation is used in order to estimate the thermal expansion coefficient α and the thermal conductivity λ from a crystal structure.

(Reference: "Science & Technology Trends", December issue 2001, "http://www.nistep.go.jp/achiev/ftx/jpn/stfc/stt009j/feature3.html#4-0", Ministry of Education, Culture, Sports, Science and Technology Japan, National Institute of Science and Technology Policy, Science and Technology Foresight Center).

First, the present inventors examined the thermal expansion coefficient α and the thermal conductivity λ that are estimated from the crystal structure, using the first principle calculation, and selected compositions that are expressed by composition formulas $Nd_2Ti_2O_7$, $La_2Si_2O_7$, $La_2Ti_2O_7$, $Sr_2Nb_2O_7$, $Sr_2Ta_2O_7$, $Sr_3Ti_2O_7$, $La_2NiO_4$ and $LaTaO_4$.

In addition, oxides or carbonates of respective component elements were selected as a starting material, and weighed to achieve a predetermined ratio, and were solid-phase mixed using a ball mill. After being dehydrated, the mixed particles were presintered at 1200° C. As a result of identifying the obtained presintered particles using particle X-ray diffraction, it was confirmed that no unreacted material component was left, and all specimens were single-phased.

Next, each of above specimens was sintered at 1400° C., and rod shaped specimens of 4×4×15 mm were cut out from the sintered compact to measure their thermal expansion coefficients. Table 1 shows values of thermal expansion coefficients at 1000° C. A thermal expansion coefficient value of 3YSZ (3 mol % $Y_2O_3$—$ZrO_2$: yttria partially stabilized zirconia) is also shown in the table as a comparative material.

TABLE 1

| Material | Thermal expansion coefficient ($\times 10^{-6}$/° C.) |
|---|---|
| 3YSZ (comparative material) | 9.92 |
| $Nd_2Ti_2O_7$ | 10.01 |
| $La_2Si_2O_7$ | 7.97 |
| $La_2Ti_2O_7$ | 9.60 |
| $Sr_2Nb_2O_7$ | 10.77 |
| $Sr_2Ta_2O_7$ | 7.93 |
| $Sr_3Ti_2O_7$ | 11.99 |
| $La_2NiO_4$ | 13.98 |
| $LaTaO_4$ | 5.33 |

Among the manufactured specimens, $Nd_2Ti_2O_7$, $Sr_2Nb_2O_7$, $Sr_3Ti_2O_7$ and $La_2NiO_4$ exhibit thermal expansion coefficient values that are greater than that of 3YSZ. This suggests that when these materials are used as thermal barrier coatings, tensile stress is less likely to occur between the substrate metal part and the coatings than in the case of using the currently used zirconia.

Next, $Nd_2Ti_2O_7$, $La_2Si_2O_7$, $La_2Ti_2O_7$, $Sr_2Nb_2O_7$, $Sr_2Ta_2O_7$, $Sr_3Ti_2O_7$, $La_2NiO_4$, and $LaTaO_4$ were sintered at 1400° C., disk shaped specimens of diameter 100 mmØ and thickness 1 mm were cut out from their sintered compacts, and their thermal conductivities were measured using a laser flash method. Table 2 shows values of thermal conductivities at room temperature. A thermal conductivity value of 3YSZ (1000° C. literature value) is also shown in the table as a comparative material.

TABLE 2

| Material | Thermal conductivity (W/mK) |
|---|---|
| 3YSZ (comparative material) | 2.2 (1000° C., literature value) |
| $Nd_2Ti_2O_7$ | 2.57 |
| $La_2Si_2O_7$ | 1.68 |
| $La_2Ti_2O_7$ | 2.28 |
| $Sr_2Nb_2O_7$ | 1.74 |
| $Sr_2Ta_2O_7$ | 2.99 |
| $Sr_3Ti_2O_7$ | 5.64 |
| $La_2NiO_4$ | 2.66 |
| $LaTaO_4$ | 2.11 |

There is a relationship expressed by the following expression (1), between the thermal conductivity λ and the specific heat C of the material, the mean free path L of the thermal conduction medium (phonon), and its movement velocity v. Since the mean free path L of a phonon is in inverse proportion to the absolute temperature T (L∝(1/T)), in the case of a ceramic, expression (1) is expressed as shown in expression (2) below (where A is the proportional constant), and the thermal conductivity shows a tendency to decrease as the temperature rises.

$$\lambda \propto C \cdot L \cdot v \quad (1)$$

$$\lambda = A \cdot (C \cdot L \cdot v)/T \quad (2)$$

The thermal conductivities of $Nd_2Ti_2O_7$, $La_2Si_2O_7$, $La_2Ti_2O_7$, $Sr_2Nb_2O_7$, $Sr_2Ta_2O_7$, $Sr_3Ti_2O_7$ and $La_2NiO_4$, shown in Table 2, are the values that were measured at room temperature (approximately 300K). According to expression (2), the thermal conductivity of these materials at 1000° C. (1273K) can be presumed to be approximately one fourth of the value at the room temperature. Table 3 shows their presumed thermal conductivity values at 1000° C.

As shown in Table 3, the thermal conductivities of all of these materials at 1000° C. can be presumed to be smaller than that of zirconia, and they are thus considered to be suitable as materials for a thermal barrier coating.

TABLE 3

| Material | Presumed thermal conductivity at 1000° C. (W/mK) |
|---|---|
| 3YSZ (comparative material) | 2.2 (1000° C., literature value) |
| $Nd_2Ti_2O_7$ | 0.643 |
| $La_2Si_2O_7$ | 0.420 |
| $La_2Ti_2O_7$ | 0.570 |
| $Sr_2Nb_2O_7$ | 0.435 |
| $Sr_2Ta_2O_7$ | 0.748 |
| $Sr_3Ti_2O_7$ | 1.41 |
| $La_2NiO_4$ | 0.665 |
| $LaTaO_4$ | 0.528 |

EXAMPLE 2

In the present example, the combining of the materials for which the thermal expansion coefficients and thermal conductivities were measured in the above example 1 was examined.

According to example 1, since the thermal expansion coefficients of $La_2Si_2O_7$, $La_2Ti_2O_7$, $Sr_2Ta_2O_7$ and $LaTaO_4$ are smaller than that of zirconia as they are, when they are used as materials for a thermal barrier coating, there is a possibility of tensile stress occurring. Consequently, in order to achieve high thermal expansion coefficients while maintaining the low thermal conductivities of these materials, the combining of these materials with other materials that have high thermal expansion coefficients shown in Table 1 was examined.

When combining two kinds of ceramics having a large difference between their thermal expansion coefficients, the thermal expansion coefficient of the combined material ($\alpha_c$) is expressed by the following expression (3), known as Turner's expression. In expression (3), $\alpha$ is the thermal expansion coefficient, K is the bulk-modulus, V is the volume fraction, subscript m is the matrix and subscript p is the added phase.

$$\alpha_c = (\alpha_p V_p K_p + \alpha_m V_m K_m)/(V_p K_p + V_m K_m) \quad (3)$$

Moreover, the thermal conductivity of the combined material ($\lambda_c$) is expressed by the following expression (4), known as Maxwell-Eucken's expression. In expression (4), $\lambda$ is the thermal expansion coefficient, V is the volume fraction, subscript m is the matrix and subscript p is the added phase.

$$\lambda_c = \lambda_m \{1 + 2V_p(1 - \lambda_m/\lambda_p)/(2\lambda_m/\lambda_p + 1)\}/\{1 - V_p(1 - \lambda_m/\lambda_p)/(\lambda_m/\lambda_p + 1)\} \quad (4)$$

In this case, for example, the material $LaTaO_4$ ($\alpha$=5.33, $\lambda$=2.11) having a low a thermal expansion property (low thermal conductive property) shown in Table 1 and 2 is combined with the material $Sr_3Ti_2O_7$ ($\alpha$=11.99, $\lambda$=5.64) having a high thermal expansion property (high thermal conductive property). Specifically, $Sr_3Ti_2O_7$ is taken as the matrix and $LaTaO_4$ is taken as the phase to be added. When adding 10 vol % of $LaTaO_4$, Vp=0.1, and the bulk-modulus of $Sr_3Ti_2O_7$ and $LaTaO_4$ are respectively Km=146.7 and Kp=213.6.

When these numeric values are substituted in expressions (3) and (4), $\alpha_c$=11.06 according to expression (3), and $\lambda_c$=5.11 according to expression (4).

Since $\lambda_c$=5.11 is the thermal conductivity at room temperature, when the thermal conductivity at 1000° C. is presumed to become approximately ¼, then $\lambda$=1.28. These thermal expansion coefficient and thermal conductivity are favorable values for use as a thermal barrier coating compared to those of the zirconia materials currently in use.

By combining two kinds of materials in this way, a mean thermal expansion coefficient and a mean thermal conductivity between those of both materials can be taken, and it is understood that these values can be controlled by appropriately determining the volume fractions. Furthermore, the case of combining $Sr_3Ti_2O_7$ and $LaTaO_4$ is calculated as an example here. However, it can be easily presumed that the thermal expansion coefficient and thermal conductivity can be controlled by carrying out a similar examination for the other materials shown in the table.

Therefore, the combined material of two or more kinds of materials shown in Table 1 and 2 can also be considered suitable as a material for a thermal barrier coating.

EXAMPLE 3

$Mg_2SiO_4$ is used as an insulation material for electronic/electrical devices such as IC substrates and packages. However, it has not been used for a high temperature structure material such as a thermal barrier coating. The present inventors focused on the high thermal expansion property and low thermal conductivity of $Mg_2SiO_4$, and considered its application for a thermal barrier coating. First, $Mg_2SiO_4$ and similar compounds were investigated.

$Mg_2SiO_4$ is known by the mineral name, Forsterite, and belongs to the materials which are categorized as orthorhombic and space group Pmnb, and have an olivine type structure of $M_2SiO_4$ (M is a divalent metal element). As other materials that are categorized as orthorhombic and space group Pmnb, and have an olivine type structure, there are $Fe_2SiO_4$ (Fayalite), $Mn_2SiO_4$ (Tephroite), $Ni_2SiO_4$ (Liebenbergite), $Co_2SiO_4$, and the like.

The divalent metal element expressed by the above composition formulas by M does not have to be one kind in particular, and materials of $(M, M')_2SiO_4$ form, such as $(Fe, Mg)_2SiO_4$ (Olivine), $(Ca, Mg)_2SiO_4$ (Monticellite), $(Fe, Mn)_2SiO_4$ (Knebelite), $(Ca, Mn)_2SiO_4$ (Glaucochroite), $(Ca, Fe)_2SiO_4$ (Kirschsteinite), also exist. As with this divalent metal element part expressed in the form of $(M, M')_2$, M and M' do not necessarily have a proportion of 1:1, and their proportion may be arbitrary.

The thermal stabilities of the materials expressed by $M_2SiO_4$ or $(M, M')_2SiO_4$ were investigated. FIG. 2 to FIG. 11 show phase diagrams of the respective materials. Moreover, Table 4 shows melting points (and decomposition temperatures) that can be read from the respective phase diagrams. Furthermore, reference sources for the respective phase diagrams in FIG. 2 to FIG. 11 are listed in Table 9.

TABLE 4

| Material | Melting point (and decomposition temperature) (° C.) |
|---|---|
| $Mg_2SiO_4$ | 1890 |
| $Fe_2SiO_4$ | 1205 |
| $Mn_2SiO_4$ | 1345 |
| $Ni_2SiO_4$ | 1545 |
| $Co_2SiO_4$ | 1420 |
| $(Fe,Mg)_2SiO_4$ | 1205 to 1890 |
| $(Ca,Mg)_2SiO_4$ | 1430 to 1490 |
| $(Fe,Mn)_2SiO_4$ | 1205 to 1250 |
| $(Mg,Mn)_2SiO_4$ | 1345 to 1890 |
| $(Mg,Ni)_2SiO_4$ | 1630 to 1890 |
| $CaMnSiO_4$ | 1355 |
| $CaFeSiO_4$ | 1230 |

Considering their use for a thermal barrier coating, $Fe_2SiO_4$, $Mn_2SiO_4$, $(Fe, Mn)_2SiO_4$, $CaMnSiO_4$, $CaFeSiO_4$, which have melting points below 1400° C., are clearly inappropriate. However, as is understood in the case of $(Fe, Mg)_2SiO_4$ for example, by combining $Mg_2SiO_4$, which has a high melting point, and $Fe_2SiO_4$, which has a low melting point, it is possible to create $(Fe, Mg)_2SiO_4$, which has a melting point between these two melting points. Moreover, it can be read from the phase diagram of FeO—MgO—$SiO_2$ in FIG. 7 that the melting point can be controlled according to the proportion of Fe and Mg. Therefore, it can be easily presumed that a material having a desirable melting point can also be obtained in cases other than with Fe and Mg, according to the combination and proportion of elements, M and M', in $(M, M')_2SiO_4$.

Consequently, for the compositions expressed by the composition formulas, $Mg_2SiO_4$, $Ni_2SiO_4$, $CO_2SiO_4$, $(Ca, Mg)_2SiO_4$, $(Mg, Co)_2SiO_4$, $(Mg, Ni)_2SiO_4$ and $(Ni, Co)_2SiO_4$, oxide fine particles of respective component elements were weighed to predetermined proportions and were solid-phase mixed using a ball mill. After that they were dehydrated and presintered at 1200° C. to manufacture presintered particles. As a result of identifying these presintered particles using particle X-ray diffraction, it was confirmed that no unreacted material component such as $SiO_2$ was left, and all specimens were single-phased.

Table 5 shows theoretical densities of the materials shown in Table 4. However, those which are inappropriate for use in a thermal barrier coating due to their melting points being below 1400° C. are omitted. Moreover, Table 5 also shows the results from measuring the densities of sintered compacts of the respective presintered particles, $Mg_2SiO_4$, $Ni_2SiO_4$, $Co_2SiO_4$, $(Ca, Mg)_2SiO_4$, $(Mg, Co)_2SiO_4$, $(Mg, Ni)_2SiO_4$ and $(Ni, Co)_2SiO_4$ manufactured as described above, after sintering them at 1400° C. However, among these, $Co_2SiO_4$ has been excluded from measurement because its sintered compact partially melted. Moreover, a density value of 3YSZ (3 mol % $Y_2O_3$—$ZrO_2$: yttria partially stabilized zirconia) is also shown in the table as a comparative material.

TABLE 5

| Material | Theoretical density (g/cm³) | Measurement density (g/cm³) | Relative density (%) |
|---|---|---|---|
| 3YSZ (comparative material) | ≦6.00 | 5.844 | ≦97.4 |
| $Mg_2SiO_4$ | 3.222 | 2.538 | 78.22 |
| $Ni_2SiO_4$ | 4.923 | 4.040 | 82.06 |
| $Co_2SiO_4$ | 4.708 | — | — |
| $(Ca,Mg)_2SiO_4$ | 3.057 | 2.374 | 89.43 |
| $(Mg,Co)_2SiO_4$ | ≦3.97 | 3.722 | ≦93.8 |
| $(Mg,Ni)_2SiO_4$ | ≦4.07 | 3.088 | ≦75.9 |
| $(Ni,Co)_2SiO_4$ | ≦4.82 | 4.249 | ≦88.2 |

The relative density of 3YSZ, shown as a comparative material, is approximately 97% and is a rather dense body. On the other hand, the other materials show lower relative density values of 75 to 94%. This can be presumed to mean that $M_2SiO_4$ and $(MM')_2SiO_4$ materials are generally unlikely to sinter compared to zirconia. When thermal-sprayed onto metal parts as a thermal barrier coating, it is in a state having a large number of pores as shown in FIG. 1. Since the insulation efficiency of the material can be maintained due to the large number of such pores, materials, which have an olivine type structure of $M_2SiO_4$ and $(MM')_2SiO_4$ and are considered to be unlikely to be denser than the currently used zirconia, are considered to be suitable for a thermal barrier coating.

Furthermore, since theoretical densities of all the materials are approximately ½ to ⅝ that of zirconia, a weight reduction can be achieved when they are applied as a thermal barrier coating. This is expected to have an excellent influence on the efficiency of a gas turbine and the like, and hence these materials are considered to be practically suitable from this point of view also.

EXAMPLE 4

Next, the compositions expressed by the composition formulas, $Mg_2SiO_4$, $Ni_2SiO_4$, $(Ca, Mg)_2SiO_4$, $(Mg, Co)_2SiO_4$, $(Mg, Ni)_2SiO_4$ and $(Ni, Co)_2SiO_4$ were manufactured by sintering at 1400° C. Then rod shaped specimens of 4×4×15 mm were cut out from each of obtained sintered compacts to measure their thermal expansion coefficients. Table 6 shows values of thermal expansion coefficients at 1000° C. A thermal expansion coefficient value of 3YSZ is also shown in the table as a comparative material.

TABLE 6

| Material | Thermal expansion coefficient (×10⁻⁶/° C.) |
|---|---|
| 3YSZ (comparative material) | 9.92 |
| $Mg_2SiO_4$ | 11.59 |

TABLE 6-continued

| Material | Thermal expansion coefficient (×10⁻⁶/° C.) |
|---|---|
| $Ni_2SiO_4$ | 12.59 |
| $(Ca,Mg)_2SiO_4$ | 11.89 |
| $(Mg,Co)_2SiO_4$ | 11.40 |
| $(Mg,Ni)_2SiO_4$ | 10.97 |
| $(Ni,Co)_2SiO_4$ | 10.42 |

As shown in Table 6, all of the manufactured specimens exhibited a greater thermal expansion coefficient than that of 3YSZ. This suggests that when these materials are used as thermal barrier coatings, tensile stress is less likely to occur between the substrate metal part and the coatings than in the case of using the currently used zirconia. Therefore, from this point of view also, these materials having an olivine type structure of $M_2SiO_4$ and $(MM')_2SiO_4$ are considered to be suitable for a thermal barrier coating.

Next, the compositions expressed by the composition formulas $Mg_2SiO_4$, $Ni_2SiO_4$, $(Ca, Mg)_2SiO_4$ and $(Mg, Co)_2SiO_4$ were manufactured by sintering at 1400° C., and disk shaped specimens of diameter 10 mmØ and thickness 1 mm were cut out from each of the obtained sintered compacts. Then their thermal conductivities were measured using a laser flash method. Table 7 shows values of thermal conductivities at room temperature. A thermal conductivity value of 3YSZ (1000° C. literature value) is also shown in the table as a comparative material.

TABLE 7

| Material | Thermal conductivity (W/mK) |
|---|---|
| 3YSZ (comparative material) | 2.2 (1000° C., literature value) |
| $Mg_2SiO_4$ | 4.00 |
| $Ni_2SiO_4$ | 8.52 |
| $(Ca,Mg)_2SiO_4$ | 3.85 |
| $(Mg,Co)_2SiO_4$ | 3.29 |

Carrying out a similar examination to that described in the above example 1, the thermal conductivities of $Mg_2SiO_4$, $Ni_2SiO_4$, $(Ca, Mg)_2SiO_4$ and $(Mg, Co)_2SiO_4$ at 1000° C. (1273K) shown in Table 7 can be presumed to be approximately ¼ of the thermal conductivity values at room temperature (approximately 300K). Table 8 shows the presumed thermal conductivity values at 1000° C.

TABLE 8

| Material | Presumed thermal conductivity at 1000° C. (W/mK) |
|---|---|
| 3YSZ (comparative material) | 2.2 (1000° C., literature value) |
| $Mg_2SiO_4$ | 1.00 |
| $Ni_2SiO_4$ | 2.13 |
| $(Ca,Mg)_2SiO_4$ | 0.963 |
| $(Mg,Co)_2SiO_4$ | 0.823 |

As shown in Table 8, the thermal conductivities of these materials at 1000° C. can all be presumed to be smaller than that of zirconia, and they are thus considered to be sufficiently suitable for a thermal barrier coating.

TABLE 9

Publisher: AMERICAN CERAMIC SOCIETY
Title: "PHASE DIAGRAMS FOR CERAMISTS" vols. 1 to 6
Editors: Ernst M. Levin, Carl R. Robbins, Howard F. McMurdie
Published Year: Vol. 1: 1964; Vol. 2: 1969

Figure 2:
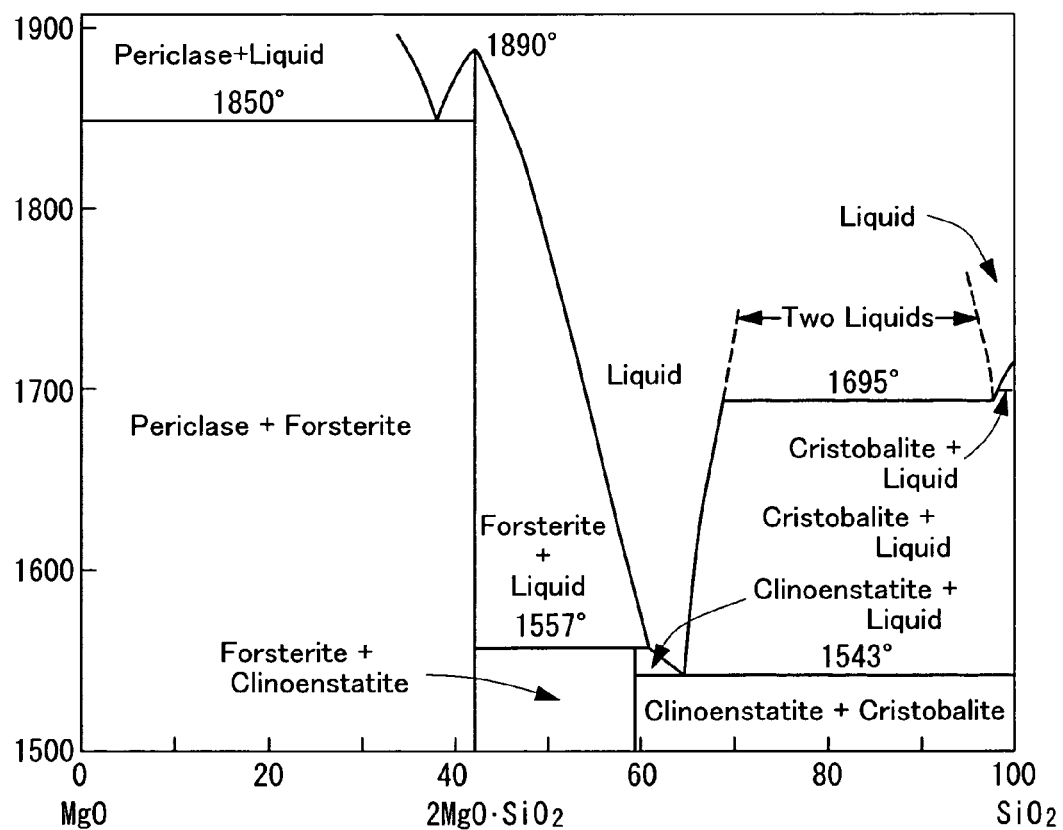
FIG. 2 is a phase diagram of $MgO—SiO_2$.
Figure 3:
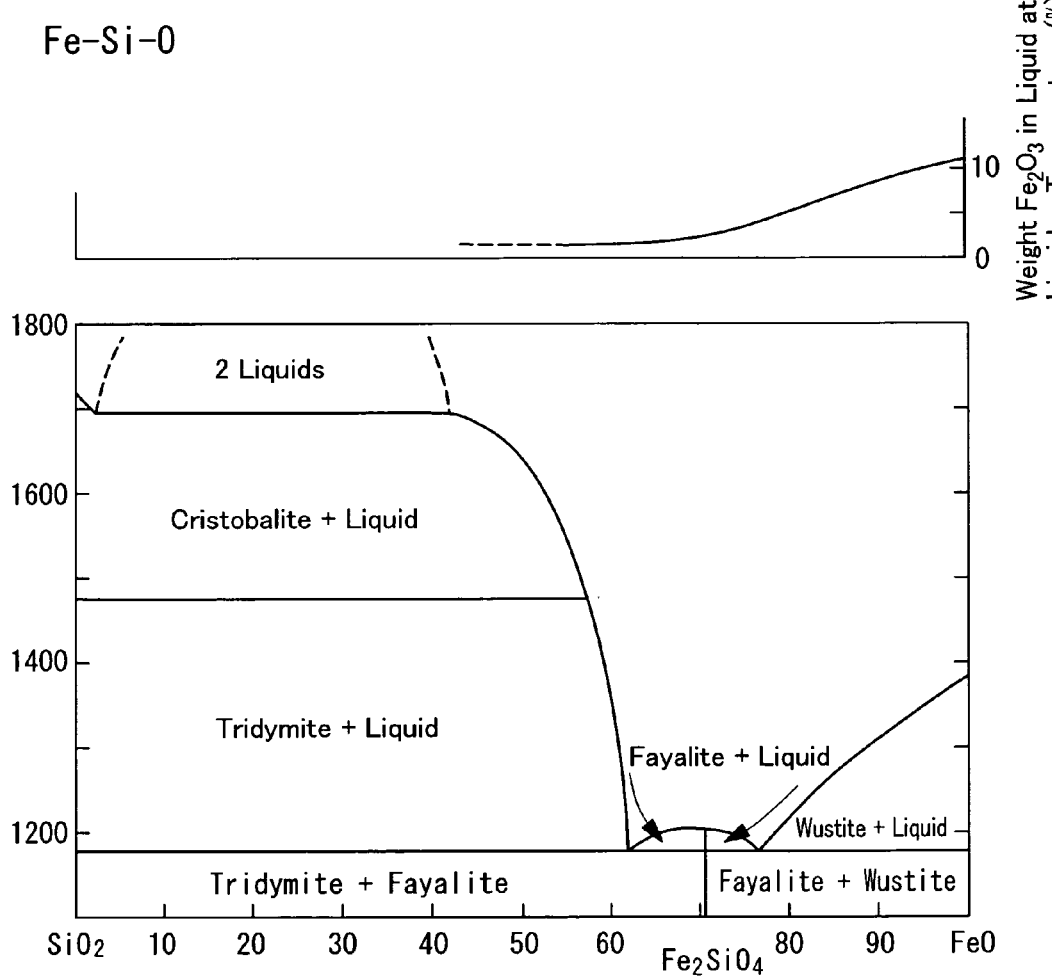
FIG. 3 is a phase diagram of $FeO—SiO_2$.
Figure 4:
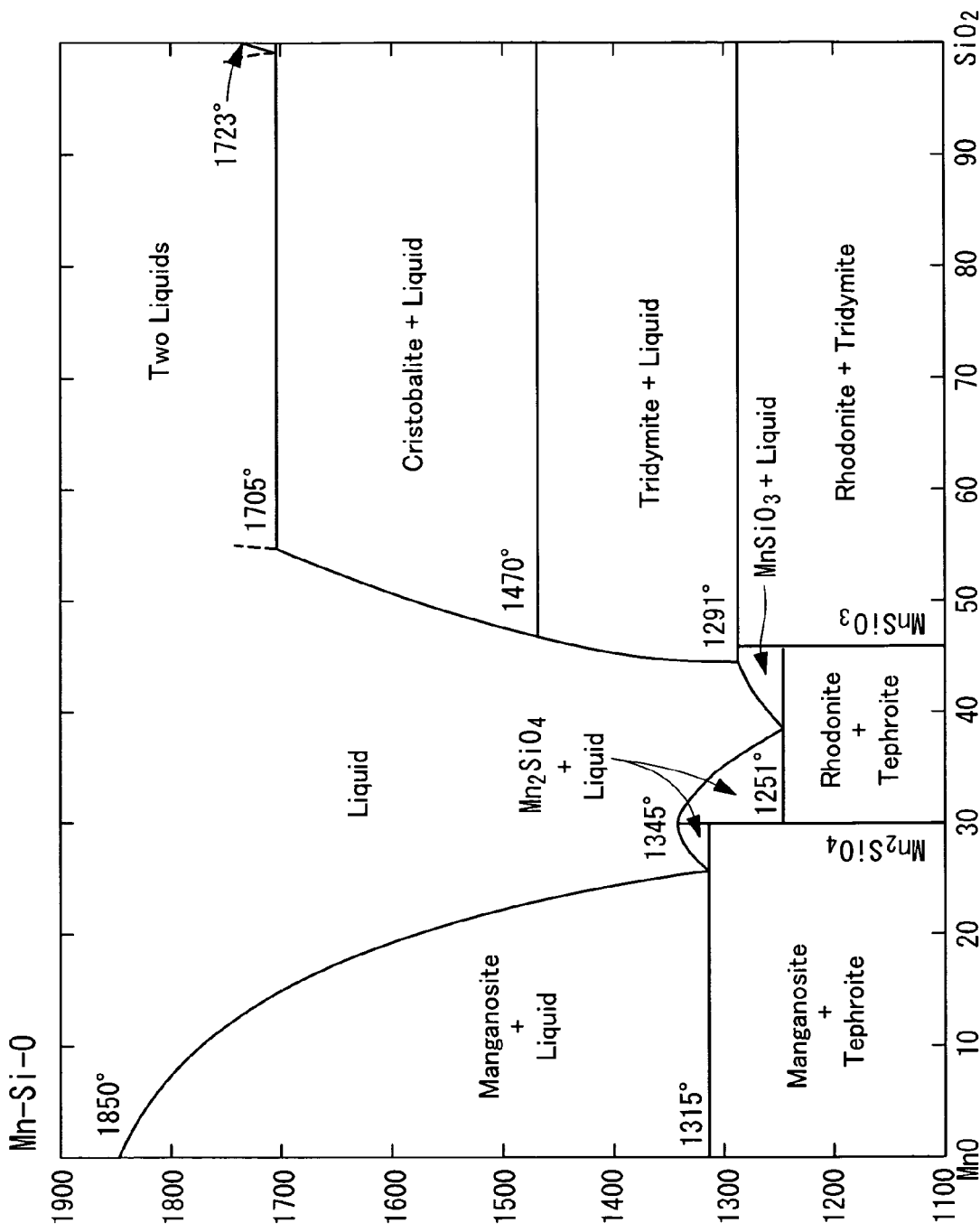
FIG. 4 is a phase diagram of $MnO—SiO_2$.
Figure 5:
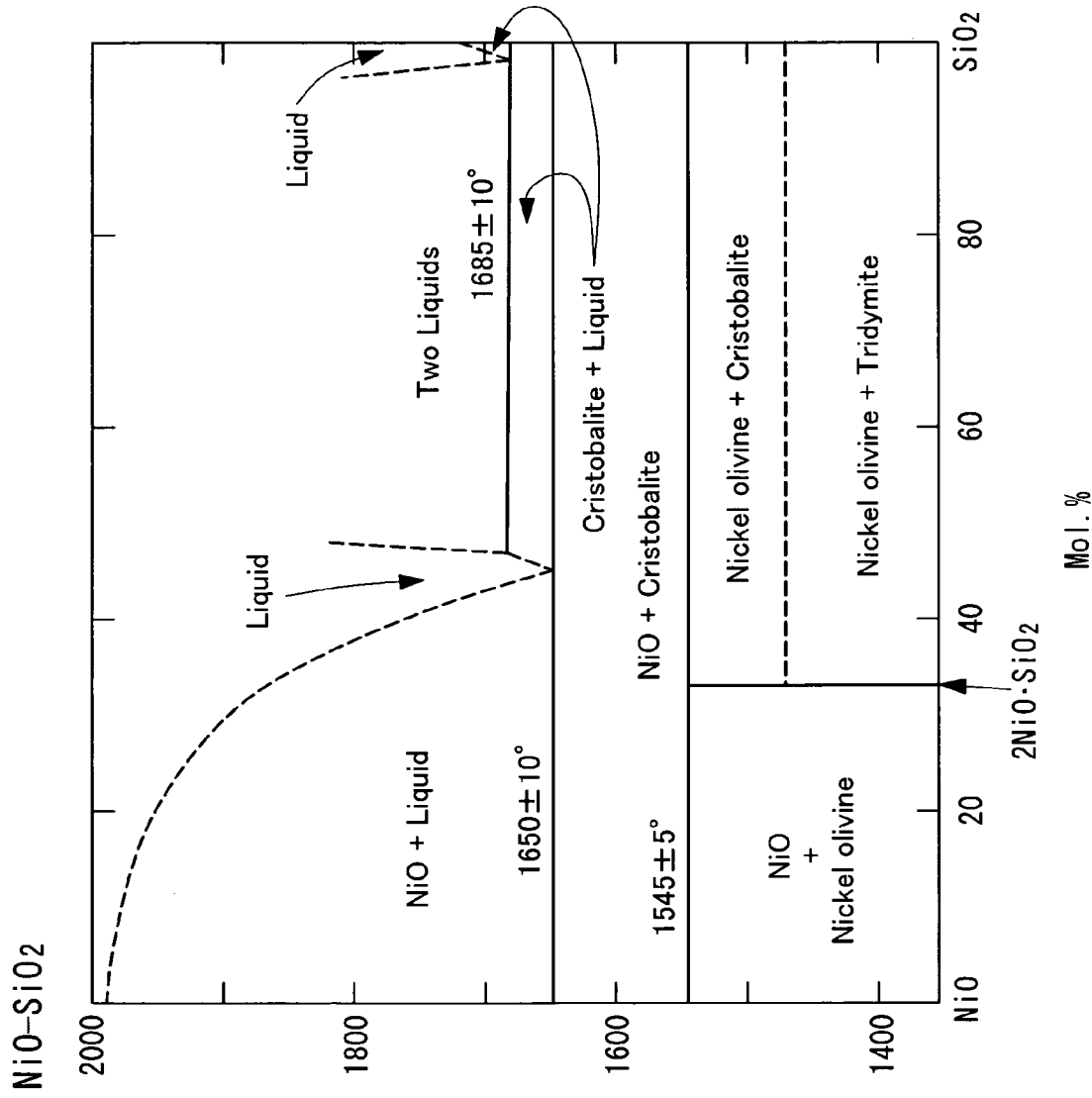
FIG. 5 is a phase diagram of $NiO—SiO_2$.
Figure 6:
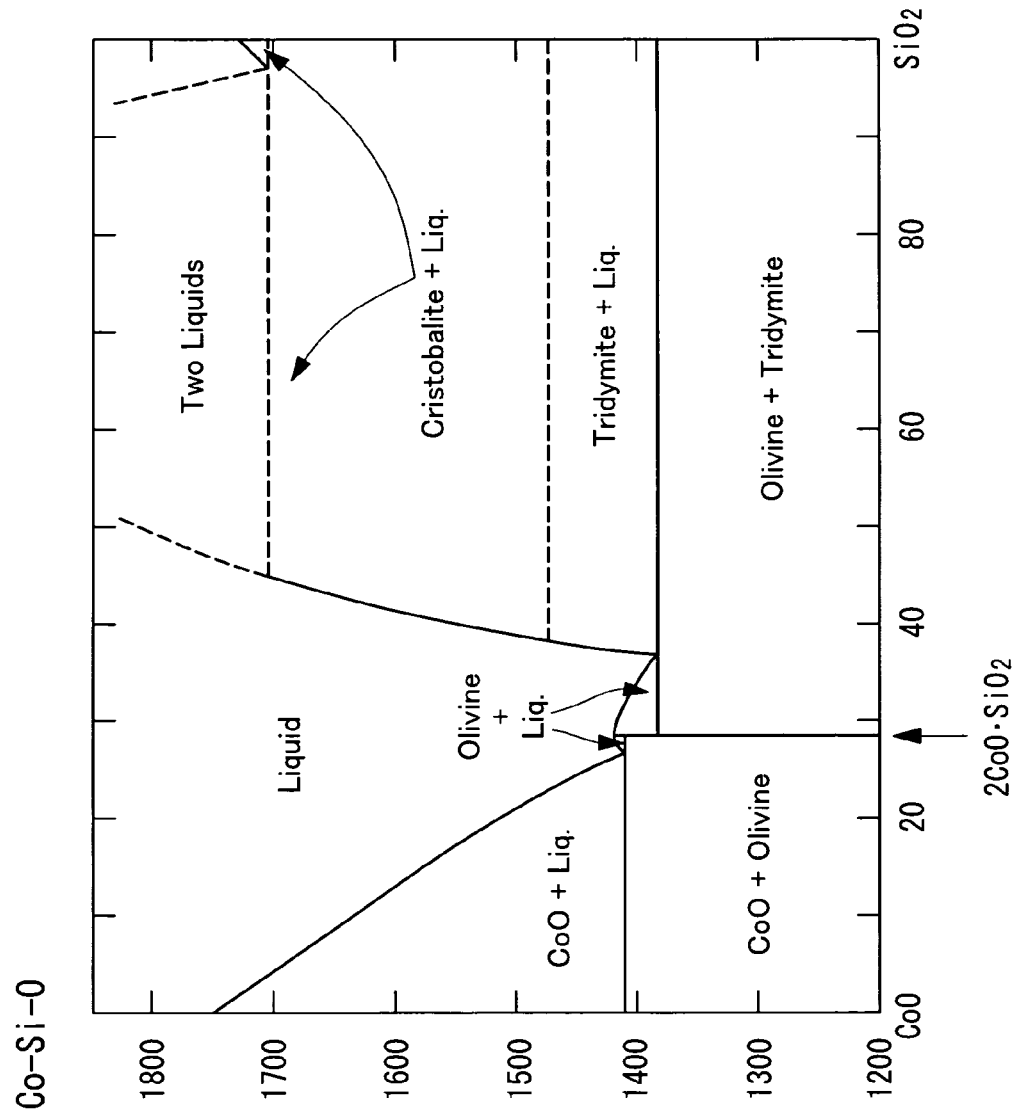
FIG. 6 is a phase diagram of $CoO—SiO_2$.
Figure 7:
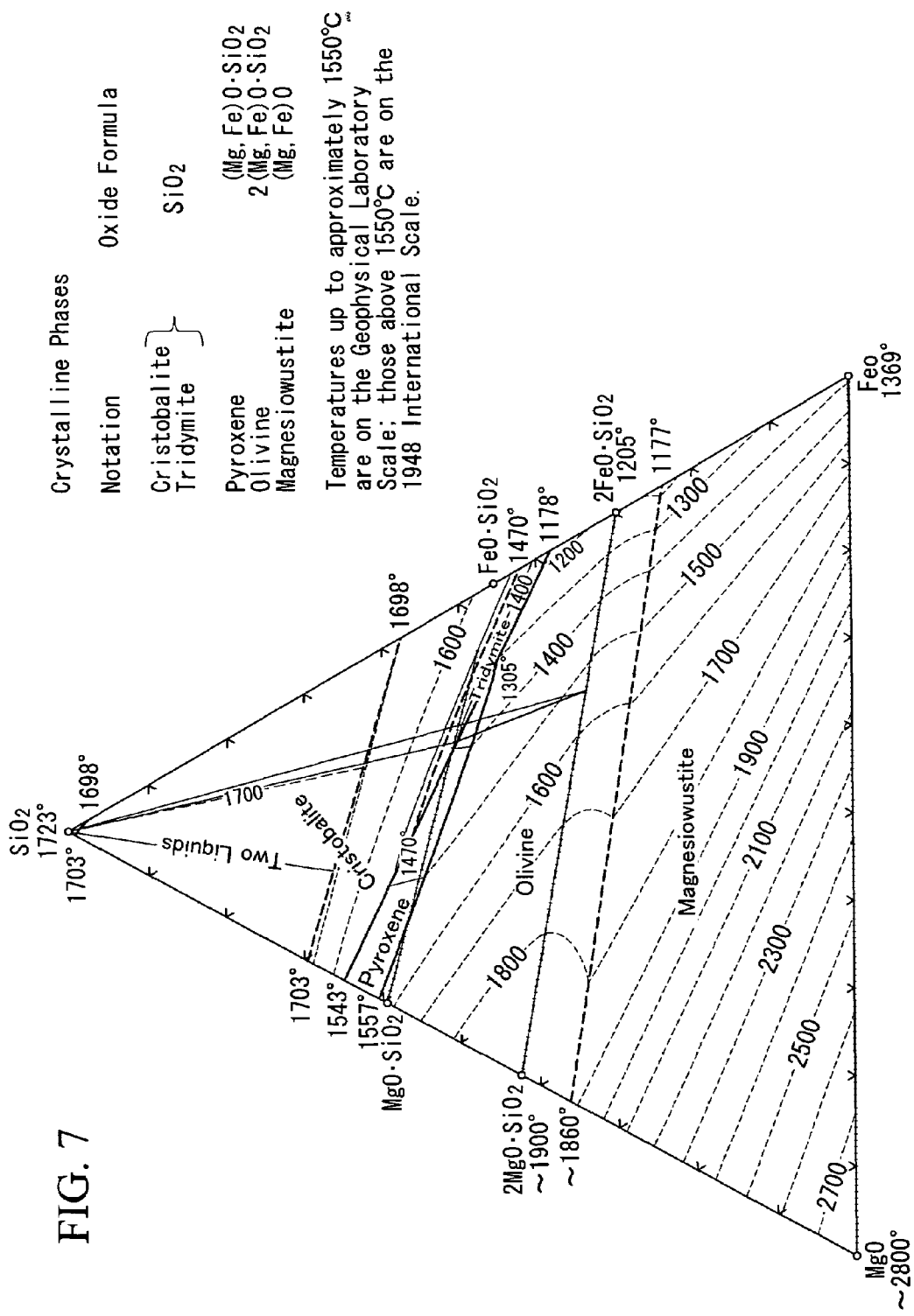
FIG. 7 is a phase diagram of $FeO—MgO—SiO_2$.
Figure 8:
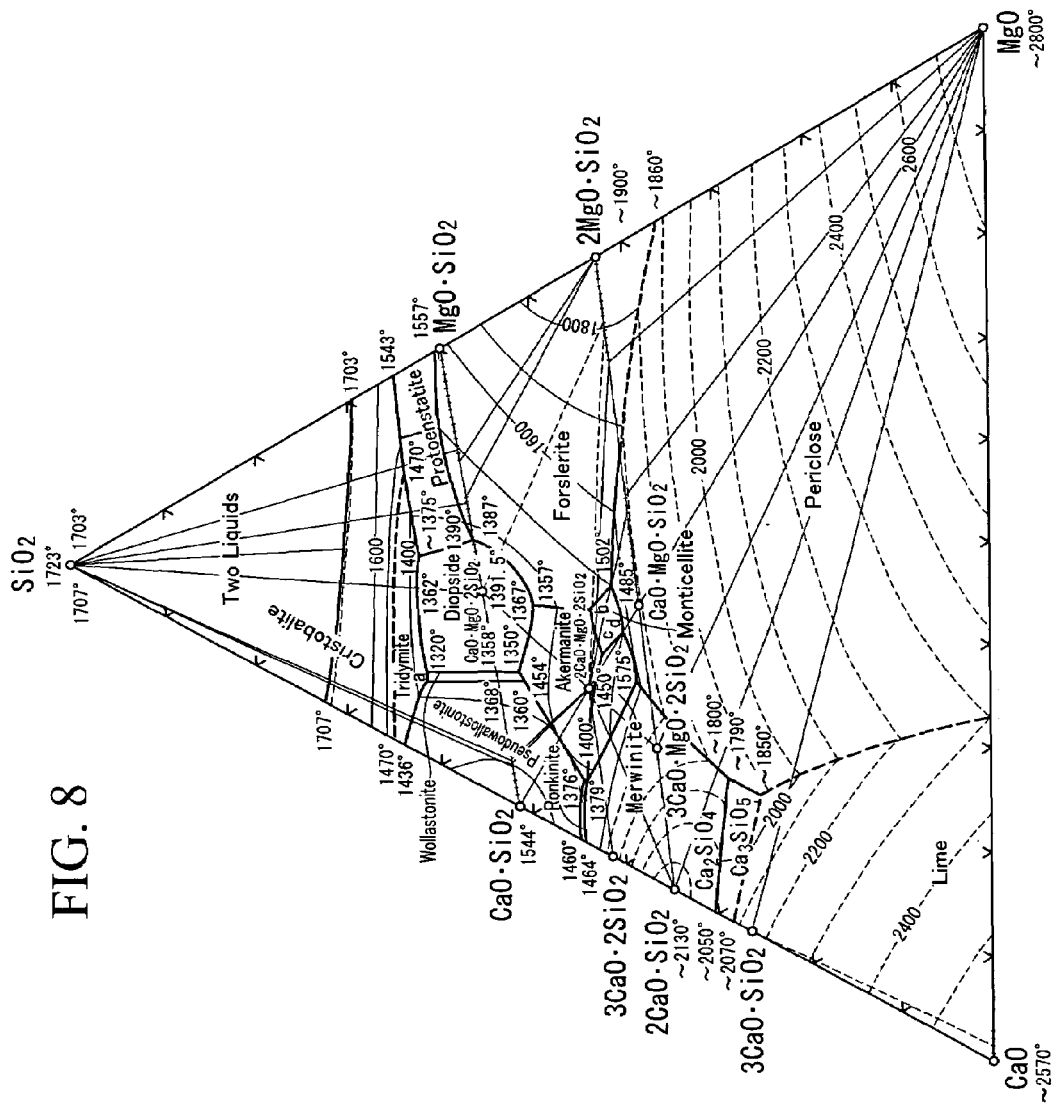
FIG. 8 is a phase diagram of $CaO—MgO—SiO_2$.
Figure 9:
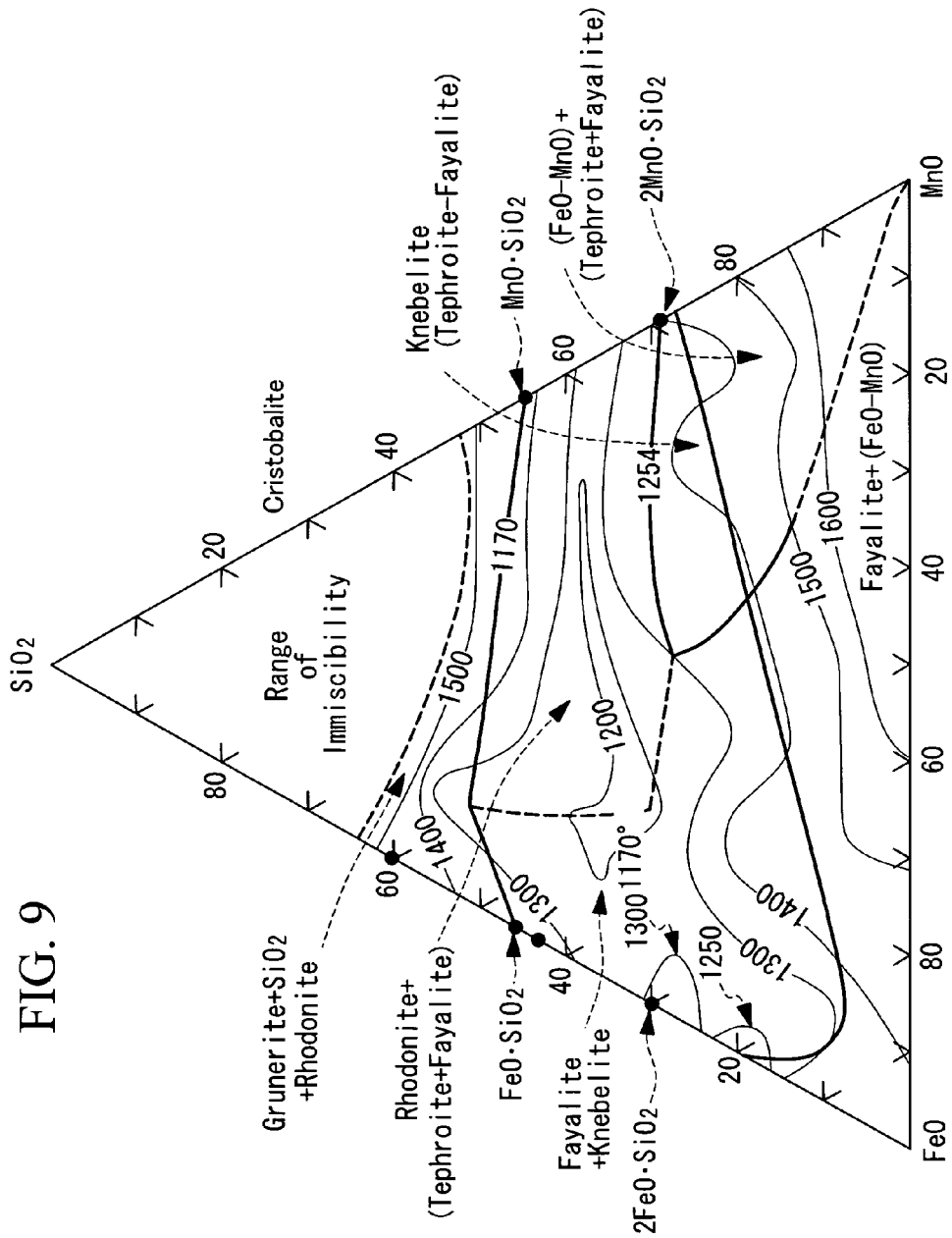
FIG. 9 is a phase diagram of $FeO—MnO—SiO_2$.
Figure 10:
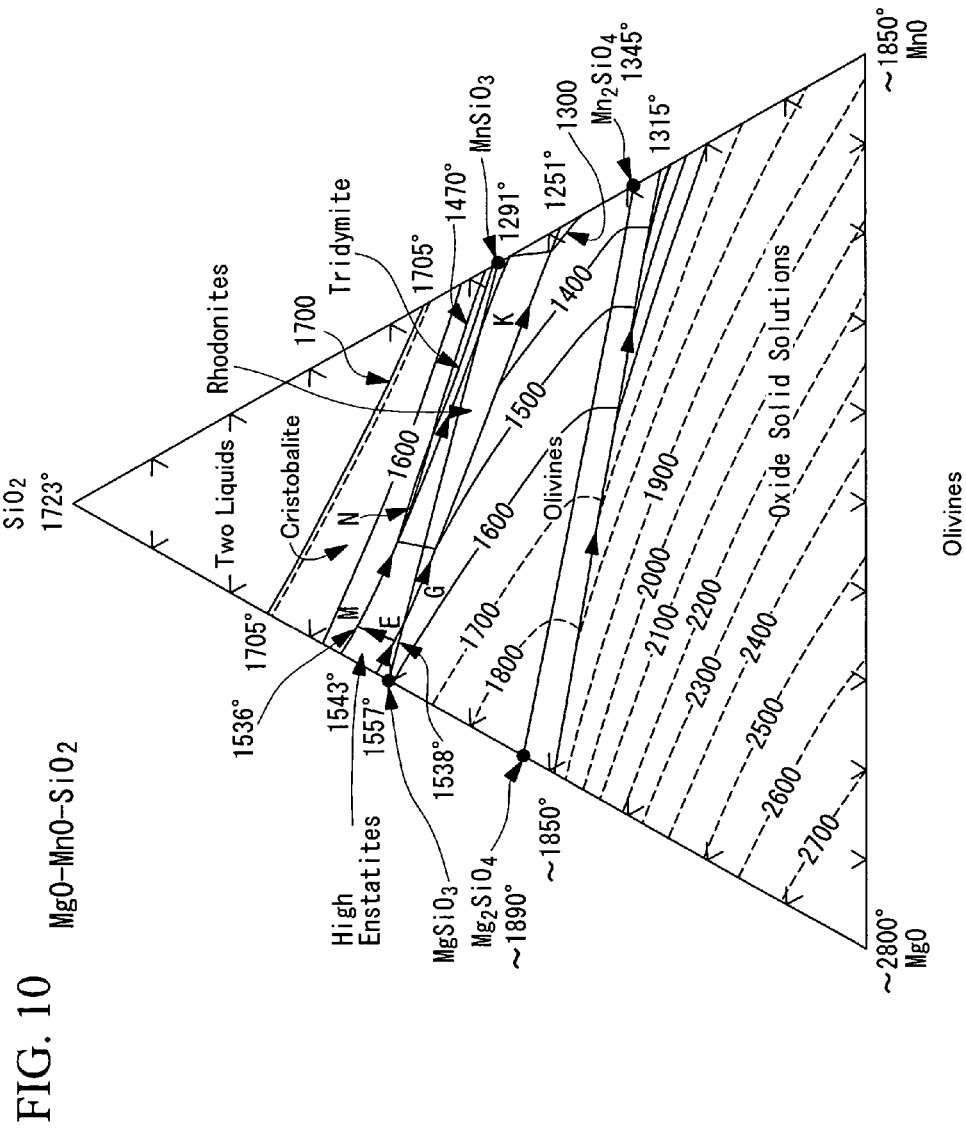
FIG. 10 is a phase diagram of $MgO—MnO—SiO_2$.
Figure 11:
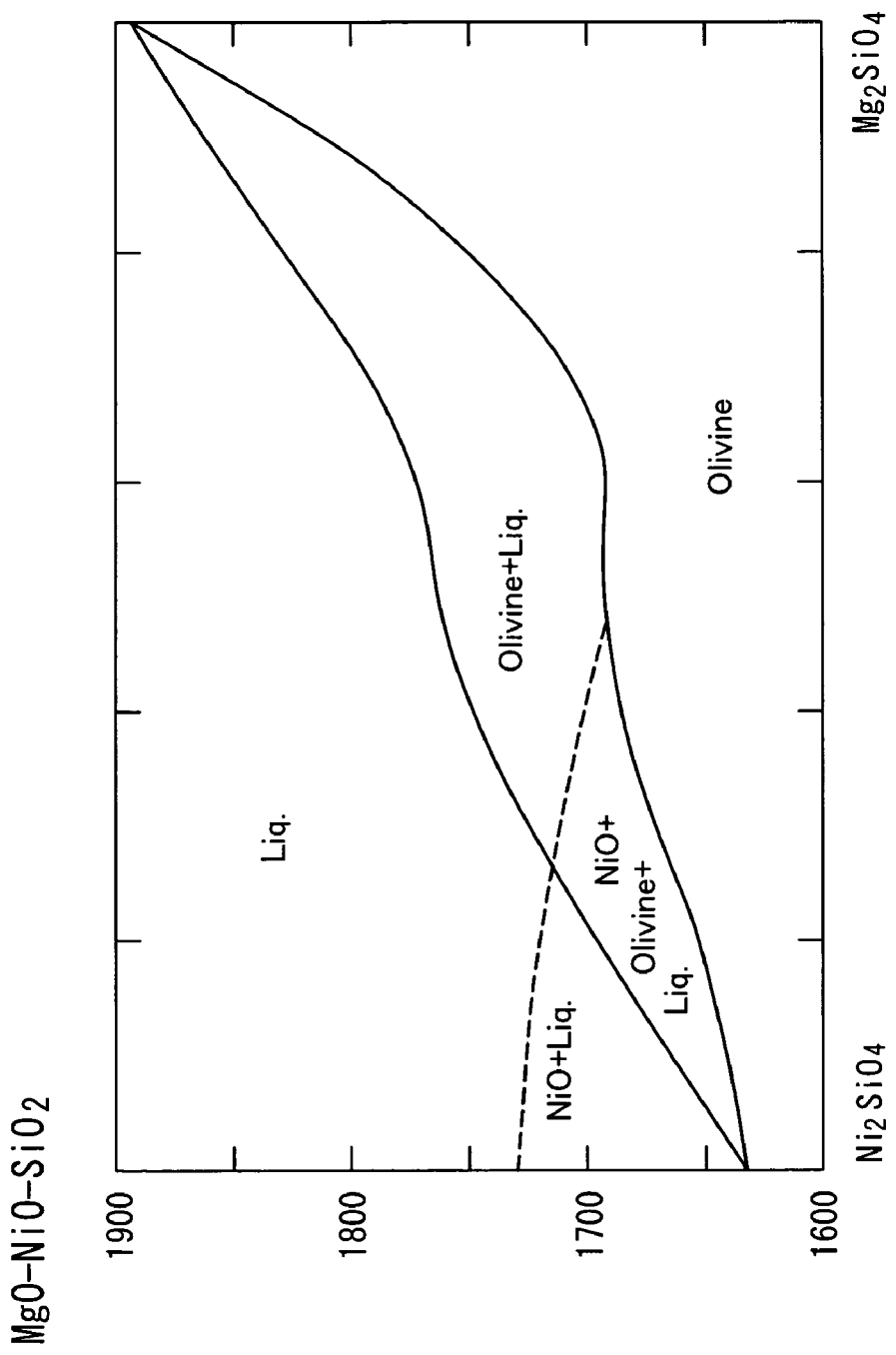
FIG. 11 is a phase diagram of $Mg_2SiO_4—Ni_2SiO_4$.

| Fig. No. | Composition formula | Volume | Page | Reference diagram |
|---|---|---|---|---|
| FIG. 2 | MgO—$SiO_2$ | Vol. 1 | 112 | FIG. 266 |
| FIG. 3 | Fe—Si—O | Vol. 1 | 59 | FIG. 80 |
| FIG. 4 | Mn—Si—O | Vol. 1 | 65 | FIG. 101 |
| FIG. 5 | NiO—$SiO_2$ | Vol. 2 | 90 | FIG. 2324 |
| FIG. 6 | Co—Si—O | Vol. 2 | 23 | FIG. 2120 |
| FIG. 7 | FeO—MgO—$SiO_2$ | Vol. 1 | 236 | FIG. 682 |
| FIG. 8 | CaO—MgO—$SiO_2$ | Vol. 1 | 210 | FIG. 598 |
| FIG. 9 | FeO—MnO—$SiO_2$ | Vol. 1 | 239 | FIG. 689 |
| FIG. 10 | MgO—MnO—$SiO_2$ | Vol. 1 | 242 | FIG. 699 |
| FIG. 11 | MgO—NiO—$SiO_2$ | Vol. 1 | 243 | FIG. 702 |

EXAMPLE 5

In the present example, a similar examination of the thermal expansion coefficient α and the thermal conductivity λ of other oxides containing Nb was carried out based on $Sr_2Nb_2O_7$, which was mentioned in the previous example 1 as being suitable for a thermal barrier coating because its thermal expansion coefficient was presumed to be greater than that of zirconia, and because its thermal conductivity was presumed to be smaller than that of zirconia. Moreover, a similar examination of the thermal expansion coefficient α and the thermal conductivity λ was carried out for an oxide based on $La_2NiO_4$, described in example 1, but having La replaced with another trivalent rare earth element such as Pr, Nd or Eu, and for an oxide based on $LaTaO_4$, described in example 1, but having La replaced with another trivalent metal element such as Al, V, Cr, Fe, Ga, Y, Rh, In, Ce, Nd, Sm, Eu, Gd, Dy, Ho, Er, Tm, Yb and Lu, and for other oxides containing Ta. The materials selected here were: $Sr_4Nb_2O_9$ and $Sr_5Nb_4O_{15}$ having changed proportions of Sr and Nb; $Ca_2Nb_2O_7$ using the same alkali earth metal Ca instead of Sr; oxides containing Nb, such as $YNbO_4$ and $LaNbO_4$, which use a rare earth element instead of Sr; $Nd_2NiO_4$, which replaces Nd for La in $La_2NiO_4$, and $NdTaO_4$, which replaces Nd for La in $LaTaO_4$; $Ca_4Ta_2O_9$; and $BaTa_2O_6$. Table 10 shows these materials.

TABLE 10

| Material | Melting point (° C.) |
|---|---|
| $Sr_4Nb_2O_9$ | 1700 |
| $Sr_5Nb_4O_{15}$ | 1475 |
| $Ca_2Nb_2O_7$ | 1571 |
| $YNbO_4$ | 2000 |
| $LaNbO_4$ | 1620 |
| $Nd_2NiO_4$ | 1900 |
| $NdTaO_4$ | 1900 |
| $Ca_4Ta_2O_9$ | 1990 |
| $BaTa_2O_6$ | 1875 |

As shown in Table 10, melting points of these materials are all equal to or greater than 1400° C., and their thermal stabilities are considered to pose no problems within the applicable temperature range of a thermal barrier coating.

When combining the materials shown in Table 10, oxides, hydroxides, or carbonates of respective component elements were selected as a starting material, and were weighed to achieve a predetermined ratio, and were solid-phase mixed using a ball mill. After being dehydrated, the mixed particles were presintered at 1400° C. As a result of identifying the obtained presintered particles using particle X-ray diffraction, it was confirmed that no unreacted material component was left, and all specimens were single-phased. Next, each of the above specimens was sintered at 1500° C., and rod shaped specimens of 4×4×15 mm were cut out from the sintered compacts to measure their thermal expansion coefficients. Table 11 shows values of thermal expansion coefficients at 1000° C. A thermal expansion coefficient of 3YSZ is also shown in the table as a comparative material.

TABLE 11

| Material | Thermal expansion coefficient ($\times 10^{-6}/°$ C.) |
|---|---|
| 3YSZ (comparative material) | 9.92 |
| $Sr_4Nb_2O_9$ | 14.47 |
| $Sr_5Nb_4O_{15}$ | 11.27 |
| $Ca_2Nb_2O_7$ | 12.06 |
| $YNbO_4$ | 9.22 |
| $LaNbO_4$ | 12.64 |
| $Nd_2NiO_4$ | 14.05 |
| $NdTaO_4$ | 9.87 |
| $Ca_4Ta_2O_9$ | 7.38 |
| $BaTa_2O_6$ | 7.79 |

Among the manufactured specimens, the thermal expansion coefficient values of $Sr_4Nb_2O_9$, $Sr_5Nb_4O_{15}$, $Ca_2Nb_2O_7$ and $LaNbO_4$ show greater values than that of 3YSZ. This suggests that when these materials are used as thermal barrier coatings, tensile stress is less likely to occur between the substrate metal part and the coating than when the currently used zirconia is used. Also, although the thermal expansion coefficient of $YNbO_4$ is smaller than that of zirconia, it is substantially equal to that of zirconia. As a result, when it is used as a thermal barrier coating, the tensile stress that occurs between the substrate metal part and itself can be presumed to be equal to that in the case of using the currently used zirconia, and it is not considered to have any problem as a thermal barrier material in terms of thermal expansion.

Furthermore, the thermal expansion coefficients of only 9 kinds of specimens, shown in Table 11, have been measured in the present example. However, even an oxide having rare earth elements other than Nd, such as Pr and Eu replacing La in $La_2NiO_4$, and an oxide having trivalent metal elements other than Nd such as Al, V, Cr, Fe, Ga, Y, Rh, In, Ce, Sm, Eu, Gd, Dy, Ho, Er, Tm, Yb and Lu replacing La in $LaTaO_4$, have a crystal structure similar to that of $Nd_2NiO_4$ and $NdTaO_4$. As a result, their thermal expansion coefficients can be easily presumed to be substantially the same.

Next, $Sr_4Nb_2O_9$, $Ca_2Nb_2O_7$, $YNbO_4$, $Nd_2NiO_4$, $NdTaO_4$, $Ca_4Ta_2O_9$ and $BaTa_2O_6$ were sintered at 1500° C., disk shaped specimens of diameter 10 mmØ and thickness 1 mm were cut out from their sintered compacts, and their thermal conductivities were measured using a laser flash method. Table 12 shows values of thermal conductivities at room temperature. A thermal conductivity value of 3YSZ (1000° C. literature value) is also shown in the table as a comparative material.

TABLE 12

| Material | Thermal conductivity (W/mK) |
|---|---|
| 3YSZ (comparative material) | 2.2 (1000° C., literature value) |

TABLE 12-continued

| Material | Thermal conductivity (W/mK) |
|---|---|
| $Sr_4Nb_2O_9$ | 1.02 |
| $Ca_2Nb_2O_7$ | 2.10 |
| $YNbO_4$ | 1.95 |
| $Nd_2NiO_4$ | 1.84 |
| $NdTaO_4$ | 2.15 |
| $Ca_4Ta_2O_9$ | 2.18 |
| $BaTa_2O_6$ | 1.60 |

Having carried out an examination similar to that described in example 1, the thermal conductivity at 1000° C. (1273K) was estimated by the expression (2) described previously, yielding the results shown in Table 13.

TABLE 13

| Material | Presumed thermal conductivity at 1000° C. (W/mK) |
|---|---|
| 3YSZ (comparative material) | 2.2 (1000° C., literature value) |
| $Sr_4Nb_2O_9$ | 0.255 |
| $Ca_2Nb_2O_7$ | 0.525 |
| $YNbO_4$ | 0.488 |
| $Nd_2NiO_4$ | 0.460 |
| $NdTaO_4$ | 0.538 |
| $Ca_4Ta_2O_9$ | 0.545 |
| $BaTa_2O_6$ | 0.400 |

As shown in Table 13, thermal conductivities of all of these materials at 1000° C. can be presumed to be smaller than that of zirconia, and they are thus considered to be suitable as materials for a thermal barrier coating.

Moreover, since it is possible to control the thermal expansion coefficient and thermal conductivity by using the expressions (3) and (4) described in example 2, the combined material of two or more kinds of materials shown in Table 11 and Table 12 is also considered to be a sufficiently suitable material for a thermal barrier coating. Similarly, the combined material of two or more kinds of materials shown in Table 1 and Table 2 in example 1 and shown in Table 11 and Table 12 in the present example is also considered to be a sufficiently suitable material for a thermal barrier coating.

In the present example, the thermal conductivities were measured for only 7 kinds of specimens shown in Table 12. However, even with an oxide where La in $La_2NiO_4$, is replaced by rare earth elements other than Nd, such as Pr and Eu, or with an oxide where La in $LaTaO_4$, is replaced by trivalent metal elements other than Nd such as Al, V, Cr, Fe, Ga, Y, Rh, In, Ce, Sm, Eu, Gd, Dy, Ho, Er, Tm, Yb and Lu, the crystal structure is similar to that of $Nd_2NiO_4$ and $NdTaO_4$. Therefore, it can be easily presumed to have substantially the same thermal conductivity.

EXAMPLE 6

In the present example, a similar examination of the thermal expansion coefficient α and the thermal conductivity λ of a solid solution of $BaTa_2O_6$ and a solid solution of $LaNiO_4$ and other similar compounds was carried out based on a solid solution of Sr—Nb type oxide, which was mentioned in the previous example 1 as being suitable for a thermal barrier coating because its thermal expansion coefficient was presumed to be greater than that of zirconia, and because its thermal conductivity was presumed to be smaller than that of zirconia. The materials selected here were: $Ca_4Nb_2O_9$, $Ca_{11}Nb_4O_{21}$, $BaTa_{1.8}Ti_{0.2}O_6$, $BaTa_{1.8}Zr_{0.2}O_6$, $Sr_2Nb_{1.8}Ti_{0.2}O_7$, $Sr_2Nb_{2-x}Zr_xO_7$, $Sr_4Nb_{2-x}Ti_xO_9$, $Sr_4Nb_{1.8}Zr_{0.2}O_9$, $La_3NbO_7$, $DyNbO_4$, $La_{1.8}Ca_{0.2}NiO_4$, $La_6WO_{12}$, $Ce_6WO_{12}$, $Dy_6WO_{12}$, $Sm_6WO_{12}$, $Yb_6WO_{12}$, $Y_6WO_{12}$, $Dy_2WO_6$, $Yb_2WO_6$, $SrYb_2O_4$, $La_6WO_{12}$ and $Dy_2WO_6$. Table 14 shows these materials.

TABLE 14

| Material | Melting point (° C.) |
|---|---|
| $Ca_4Nb_2O_9$ | 1700 |
| $Ca_{11}Nb_4O_{21}$ | 2005 |
| $BaTa_{1.8}Ti_{0.2}O_6$ | 1880 |
| $BaTa_{1.8}Zr_{0.2}O_6$ | 1890 |
| $Sr_2Nb_{1.8}Ti_{0.2}O_7$ | 1705 |
| $Sr_2Nb_{1.8}Zr_{0.2}O_7$ | 1702 |
| $Sr_4Nb_{1.8}Ti_{0.2}O_9$ | 1710 |
| $Sr_4Nb_{1.8}Zr_{0.2}O_9$ | 1700 |
| $La_3NbO_7$ | 1900 |
| $DyNbO_4$ | 1950 |
| $La_{1.8}Ca_{0.2}NiO_4$ | 1857 |
| $La_6WO_{12}$ | 2150 |
| $Ce_6WO_{12}$ | 2030 |
| $Dy_6WO_{12}$ | 2300 |
| $Sm_6WO_{12}$ | 2240 |
| $Yb_6WO_{12}$ | 2525 |
| $Y_6WO_{12}$ | 2400 |
| $Dy_2WO_6$ | 2200 |
| $Yb_2WO_6$ | 2200 |

As shown in Table 14, the melting point of these materials are all equal to or greater than 1700° C., and the melting point of some of these materials exceeds 2500° C., which is equal to or greater than the melting point of a solid solution of zirconia having yttria dissolved therein. Accordingly, the thermal stabilities of these materials are considered to pose no problems within the applicable temperature range of a thermal barrier coating.

Next, the materials shown in Table 15 were combined. When combining the materials, oxides, hydroxides or carbonates of respective component elements were selected as a starting material, and were weighed to achieve a predetermined ratio, and were solid-phase mixed using a ball mill. After being dehydrated, the mixed particles were presintered at 1400° C. As a result of identifying the obtained presintered particles using particle X-ray diffraction, it was confirmed that no unreacted material component was left, and all specimens were single-phased. Having examined closely each peak of the specimens, in which formation of solid solutions by substitution was intended, a peak shift in a constant direction was confirmed, and the added dissolved component was confirmed to be properly dissolved in the crystal. Next, each of the above specimens was sintered at 1500° C., and rod shaped specimens of 4×4×15 mm were cut out from the sintered compacts to measure their thermal expansion coefficients. In general, thermal conductivities often vary greatly among similar compounds and similar crystal structures due to their slight differences. However, thermal expansion coefficients seldom vary significantly. Specifically, since it is clear that: the thermal expansion coefficient values of $Ca_4Nb_2O_9$ and $Ca_{11}Nb_4O_{21}$ are equal to that of $Ca_2Nb_2O_7$; the thermal expansion coefficient values of $BaTa_{2-x}Ti_xO_6$ and $BaTa_{2-x}Zr_xO_6$ are equal to that of $BaTa_2O_6$; the thermal expansion coefficient values of $Sr_2Nb_{2-x}Ti_xO_7$ and $Sr_2Nb_{2-x}Zr_xO_7$ are equal to that of $Sr_2Nb_2O_7$; the thermal expansion coefficient values of $Sr_4Nb_{2-x}Ti_xO_9$ and $Sr_4Nb_{2-x}Zr_xO_9$ are equal to that of $Sr_4Nb_2O_9$; the thermal expansion coefficient values of $La_3NbO_7$ and $DyNbO_4$ are equal to that of $LaNbO_4$; the thermal expansion coefficient value of $La_{2-x}Ca_xNiO_4$ is equal to that of $LaNiO_4$; the thermal expansion coefficient values of $Ce_6WO_{12}$, $Dy_6WO_{12}$, $Sm_6WO_{12}$, $Yb_6WO_{12}$ and $Y_6WO_{12}$ are equal to that of $La_6WO_{12}$; and the thermal expansion coefficient value of $Yb_2WO_6$ is equal to that of $Dy_2WO_6$, these thermal expansion coefficients are omitted here, and the thermal expansion coefficient values of $SrYb_2O_4$, $La_6WO_{12}$ and $Dy_2WO_6$ at 1000° C. are listed in Table 15. A thermal expansion coefficient of 3YSZ is also shown in the table as a comparative material.

TABLE 15

| Material | Thermal expansion coefficient ($\times 10^{-6}$/° C.) |
|---|---|
| 3YSZ (comparative material) | 9.92 |
| $SrYb_2O_4$ | 10.85 |
| $La_6WO_{12}$ | 10.92 |
| $Dy_2WO_6$ | 10.60 |

As shown in Table 15, among the manufactured specimens, the thermal expansion coefficient values of $SrYb_2O_4$, $La_6WO_{12}$ and $Dy_2WO_6$ show greater values than that of 3YSZ. This suggests that when these materials are used as thermal barrier coatings, tensile stress is less likely to occur between the substrate metal part (base metal) and the coating than when the currently used zirconia is used.

Next, $Ca_4Nb_2O_9$, $Ca_{11}Nb_4O_{21}$, $BaTa_{1.8}Ti_{0.2}O_6$, $BaTa_{1.8}Zr_{0.2}O_6$, $Sr_2Nb_{1.8}Ti_{0.2}O_7$, $Sr_2Nb_{2-x}Zr_xO_7$, $Sr_4Nb_{2-x}Ti_xO_9$, $Sr_4Nb_{1.8}Zr_{0.2}O_9$, $La_3NbO_7$, $DyNbO_4$, $La_{1.8}Ca_{0.2}NiO_4$, $La_6WO_{12}$, $Ce_6WO_{12}$, $Dy_6WO_{12}$, $Sm_6WO_{12}$, $Yb_6WO_{12}$, $Y_6WO_{12}$, $Dy_2WO_6$ and $Yb_2WO_6$ were sintered at 1400° C., and disk shaped specimens of diameter 10 mmØ and thickness 1 mm were cut out from their sintered compacts, and their thermal conductivities were measured using a laser flash method. Table 16 shows values of thermal conductivities at room temperature. A thermal conductivity value of 3YSZ (1000° C. literature value) is also shown in the table as a comparative material.

TABLE 16

| Material | Thermal conductivity (W/mK) |
|---|---|
| 3YSZ (comparative material) | 2.2 (1000° C., literature value) |
| $Ca_4Nb_2O_9$ | 2.06 |
| $Ca_{11}Nb_4O_{21}$ | 2.01 |
| $BaTa_{1.8}Ti_{0.2}O_6$ | 1.54 |
| $BaTa_{1.8}Zr_{0.2}O_6$ | 1.58 |
| $Sr2Nb_{1.8}Ti_{0.2}O_7$ | 1.49 |
| $Sr_2Nb_{1.8}Zr_{0.2}O_7$ | 1.50 |
| $Sr_4Nb_{1.8}Ti_{0.2}O_9$ | 1.58 |
| $Sr_4Nb_{1.8}Zr_{0.2}O_9$ | 1.53 |
| $La_3NbO_7$ | 1.91 |
| $DyNbO_4$ | 1.84 |
| $La_{1.8}Ca_{0.2}NiO_4$ | 1.83 |
| $La_6WO_{12}$ | 1.83 |
| $Ce_6WO_{12}$ | 1.92 |
| $Dy_6WO_{12}$ | 1.84 |
| $Sm_6WO_{12}$ | 1.88 |
| $Yb_6WO_{12}$ | 1.92 |
| $Y_6WO_{12}$ | 1.91 |
| $Dy_2WO_6$ | 1.89 |
| $Yb_2WO_6$ | 1.82 |

From the results obtained above, an examination similar to that described in example 1 was carried out, and the thermal conductivity at 1000° C. (1273K) was estimated by the expression (2) described previously, yielding the results shown in Table 17.

TABLE 17

| Material | Presumed thermal conductivity at 1000° C. (W/mK) |
|---|---|
| 3YSZ (comparative material) | 2.2 (1000° C., literature value) |
| $Ca_4Nb_2O_9$ | 0.515 |
| $Ca_{11}Nb_4O_{21}$ | 0.503 |
| $BaTa_{1.8}Ti_{0.2}O_6$ | 0.385 |
| $BaTa_{1.8}Zr_{0.2}O_6$ | 0.395 |
| $SrNb_{1.8}Ti_{0.2}O_7$ | 0.383 |
| $Sr_2Nb_{1.8}Zr_{0.2}O_7$ | 0.375 |
| $Sr_4Nb_{1.8}Ti_{0.2}O_9$ | 0.395 |
| $Sr_4Nb_{1.8}Zr_{0.2}O_9$ | 0.383 |
| $DyNbO_4$ | 0.460 |
| $La_{1.8}Ca_{0.2}NiO_4$ | 0.485 |
| $La_6WO_{12}$ | 0.458 |
| $Ce_6WO_{12}$ | 0.480 |
| $Dy_6WO_{12}$ | 0.460 |
| $Sm_6WO_{12}$ | 0.470 |
| $Yb_6WO_{12}$ | 0.480 |
| $Y_6WO_{12}$ | 0.488 |
| $Dy_2WO_6$ | 0.473 |
| $Yb_2WO_6$ | 0.455 |

As shown in Table 16 and Table 17, thermal conductivities of all of these materials at room temperature and at 1000° C. can be presumed to be smaller than that of zirconia, and they are thus considered to be suitable as materials for a thermal barrier coating.

Moreover, since it is possible to control the thermal expansion coefficient and thermal conductivity by using the expressions (3) and (4) described in example 2, the combined material of two or more kinds of materials shown in Table 15 and Table 16 is also considered to be a sufficiently suitable material for a thermal barrier coating. Similarly, the combined material of two or more kinds of materials shown in Table 1 and Table 2 in example 1 and shown in Table 15 and Table 16 in the present example is also considered to be a sufficiently suitable material for a thermal barrier coating.

In the present example, the thermal conductivities were measured for only 19 kinds of specimen shown in Table 16. However, even with an oxide where the La in $La_6WO_{12}$ and $Dy_2WO_6$ is replaced by rare earth elements such as Pr, Nd, Eu, Gd and Er, the crystal structure is similar to that of $La_6WO_{12}$ and $Dy_2WO_6$. Therefore, it can be easily presumed can to have substantially the same thermal conductivity.

EXAMPLE 7

In the present example, a verification test was carried out to verify that a material with a thermal expansion coefficient presumed to be greater than that of zirconia, and a thermal conductivity presumed to be smaller than that of zirconia is suitable as a material for a thermal barrier coating. In this verification, the operating status of a gas turbine was taken as the target of application, and consideration was given to the thermal stress applied at the time of starting and stopping, as the states in which the largest stress is applied. A factorial examination of the phenomenon of fatigue due to this thermal stress was carried out by a thermal cycle test.

First, a Ni-base heat resistant alloy of the composition, Ni-16Cr-8.5Co-1.7Mo-2.6W-1.7T-0.9Nb-3.4Al-3.4Ti (at %), was cut out in a disk shape as a specimen substrate. After grit-blasting the surface of this substrate using $Al_2O_3$ particles, a bond coat layer formed from CoNiCrAlY alloy of composition Co-32Ni-21Cr-8Al-0.5Y (at %) was formed thereon as a metallic binder layer by means of a low pressure spraying method. Then a ceramic layer (a film formed from a thermal barrier coating material) was laminated on this bond coat layer of CoNiCrAlY alloy by means of an atmospheric pressure plasma spraying method, to form a thermal barrier coating film as a specimen.

The thickness of the bond coat layer (CoNiCrAlY alloy film) was 0.1 mm, and the thickness of the ceramic layer was 0.5 mm.

Next, a thermal cycle test was carried out in which heat was applied to this test specimen by focusing the light from a large infrared lamp onto the surface on the thermal barrier coating film side. Once the surface temperature reached a predetermined temperature, the surface was cooled down by shielding the light of the lamp using a shutter, and once the surface temperature had cooled down to a predetermined temperature, the shutter was re-opened to re-apply the heat, and this heat/cooling cycle was repeated.

Furthermore, as an acceleration condition for completing the test in a short cycle, cool air at −20° C. was blown from a nozzle toward the surface of the specimen opposite to the heated surface in order to cool down the entire specimen. As a result, around the surface of the specimen opposite to the surface of the thermal barrier coating film was cooled down to approximately 0° C., so that the entire specimen was constantly cooled down except for the surface on the thermal barrier coating film when heating by the infrared lamp. By purposely creating such a temperature difference, an extremely large thermal stress was applied centered on the film interface of the specimen. This test was carried out until peeling of the thermal barrier coating was visually confirmed.

A specimen coated with a thermal barrier coating film formed from $Sr_2Nb_2O_7$ was subjected to the above thermal cycle test. The thermal cycle test was repeatedly carried out under a condition where the maximum temperature of the heated area (thermal barrier coating film surface) of the specimen was 1450° C. and the maximum interface temperature (the maximum temperature of the interface between the thermal barrier coating film and the substrate) was 850° C. At that point, a heating time of one minute and a cooling time of one minute were repeated over. The result of this thermal cycle test is shown in Table 18. Moreover, the case of using a thermal barrier coating film of 3YSZ is also shown for comparison.

TABLE 18

| Material | No. of cycles until thermal barrier coating film surface peeled off |
|---|---|
| 3YSZ (comparative material) | 80 |
| $Sr_2Nb_2O_7$ | 600 |

As it is clear from Table 18, it could be confirmed that $Sr_2Nb_2O_7$ has an excellent effect as a material for a thermal barrier coating. This is thought to result from this material having a higher thermal expansion coefficient and lower thermal conductivity than that of the comparative material, and it can be easily presumed that an equivalent effect should be confirmed with respect to other materials.

INDUSTRIAL APPLICABILITY

According to the thermal barrier coating material related to the present invention, a thermal barrier coating film having a high thermal expansion coefficient and a low thermal conductivity can be formed. When using this coating film for a heat resistant protection film for a gas turbine and the like, excellent heat resistance and durability can be obtained. As a result, a high performance gas turbine capable of easily handling high temperature combustion gas can be obtained.

The invention claimed is:

1. A thermal barrier coating material applicable to a thermal barrier coating for coating the surface of a base metal comprising as a main component an oxide expressed by the compositional formula $A_2B_2O_7$, wherein A is an element selected from the group consisting of La, Nd, and Sr and B is one or more elements selected from the group consisting of Zr, Ti, Si, Nb, and Ta,
   wherein said oxide is an oxide selected from the group consisting of $Sr_2Nb_{2-x}Ti_xO_7$ wherein $0<x\leqq2$ and $Sr_2Nb_{2-x}Zr_xO_7$ wherein $0<x\leqq2$.

2. A thermal barrier coating material applicable to a thermal barrier coating for coating the surface of a base metal comprising as a main component an oxide containing Nb and either an alkaline earth metal or a rare earth element,
   wherein said oxide is an oxide selected from the group consisting of $Sr_4Nb_{2-x}Ti_xO_9$ wherein $0<x<2$ and $Sr_4Nb_{2-x}Zr_xO_9$ wherein $0<x<2$.

3. A thermal barrier coating material applicable to a thermal barrier coating for coating the surface of a base metal comprising as a main component an oxide containing Ta and an alkaline earth metal,
   wherein said oxide is an oxide selected from the group consisting of $BaTa_{2-x}Ti_xO_6$ wherein $0<x<2$ and $BaTa_{2-x}Zr_xO_6$ wherein $0<x<2$.

4. A thermal barrier coating material comprising as a main component, a composition of a combination of zirconia material and an oxide as in claim 1.

* * * * *